United States Patent
Ezra et al.

(10) Patent No.: US 9,311,014 B2
(45) Date of Patent: Apr. 12, 2016

(54) STORAGE SYSTEM AND METHODS OF MAPPING ADDRESSES OF SNAPSHOT FAMILIES

(71) Applicant: Infinidat Ltd., Hertzelia Pituach (IL)

(72) Inventors: Josef Ezra, Kibbutz Beit Kama (IL); Yechiel Yochai, Moshav Aviel (IL); Ido Ben-Tsion, Ramat Gan (IL); Efraim Zeidner, Haifa (IL)

(73) Assignee: INFINIDAT LTD., Hertzelia (IL)

( * ) Notice: Subject to any disclaimer, the term of this patent is extended or adjusted under 35 U.S.C. 154(b) by 346 days.

(21) Appl. No.: 14/036,557

(22) Filed: Sep. 25, 2013

(65) Prior Publication Data

US 2014/0149670 A1  May 29, 2014

Related U.S. Application Data

(60) Provisional application No. 61/730,988, filed on Nov. 29, 2012.

(51) Int. Cl.
| | |
|---|---|
| *G06F 12/00* | (2006.01) |
| *G06F 3/06* | (2006.01) |
| *G06F 11/14* | (2006.01) |
| *G06F 12/08* | (2006.01) |
| *G06F 17/30* | (2006.01) |

(52) U.S. Cl.
CPC ............. *G06F 3/065* (2013.01); *G06F 3/0604* (2013.01); *G06F 3/0605* (2013.01); *G06F 3/0614* (2013.01); *G06F 3/0683* (2013.01); *G06F 3/0689* (2013.01); *G06F 11/1446* (2013.01); *G06F 11/1458* (2013.01); *G06F 12/0864* (2013.01); *G06F 17/30088* (2013.01); *G06F 2201/84* (2013.01)

(58) Field of Classification Search
CPC ..... G06F 3/065; G06F 3/0604; G06F 3/0689; G06F 11/1446; G06F 3/0614; G06F 11/1458; G06F 12/0864; G06F 3/0683; G06F 3/0605; G06F 2201/84; G06F 17/30088
USPC .......................................................... 711/161
See application file for complete search history.

(56) References Cited

U.S. PATENT DOCUMENTS

| | | | |
|---|---|---|---|
| 4,864,497 | A | 9/1989 | Lowry et al. |
| 5,553,266 | A | 9/1996 | Metzger et al. |
| 6,353,836 | B1 | 3/2002 | Bamford et al. |
| 6,651,075 | B1 * | 11/2003 | Kusters ............... G06F 11/1448 |

(Continued)

*Primary Examiner* — Matthew Bradley
(74) *Attorney, Agent, or Firm* — Reches Patents

(57) ABSTRACT

There is provided a storage system capable to maintain a snapshot family comprising a plurality of members having hierarchical relations therebetween, and a method of operating thereof. The method comprises generating a mapping data structure with mapping entries each comprising mappings for mapping a logical address range associated with the mapping entry into physical address ranges respectively correlated to representative members of the snapshot family; omitting mappings corresponding to omitted member(s) different from any of the one or more representative members sharing a respective range of physical addresses; responsive to an access request directed to a certain logical address range and a certain omitted member, determining, using a predefined rule related to the hierarchical and sequential relations between members of the snapshot family, a representative member from the one or more representative members; and responding to the access request by using a physical address range correlated to the representative member.

20 Claims, 21 Drawing Sheets

(56) References Cited

U.S. PATENT DOCUMENTS

| | | |
|---|---|---|
| 7,600,098 B1 | 10/2009 | Chou |
| 8,019,944 B1 | 9/2011 | Favor et al. |
| 8,082,407 B1 | 12/2011 | Chatterjee et al. |
| 8,359,491 B1 | 1/2013 | Bloomstein |
| 8,706,705 B1 | 4/2014 | Warrington |
| 9,021,087 B1 | 4/2015 | Weng et al. |
| 2002/0069341 A1 | 6/2002 | Chauvel et al. |
| 2002/0073282 A1 | 6/2002 | Chauvel et al. |
| 2003/0079102 A1* | 4/2003 | Lubbers ............ G06F 3/0605 711/202 |
| 2004/0078533 A1 | 4/2004 | Lee et al. |
| 2004/0267706 A1 | 12/2004 | Springer et al. |
| 2005/0005070 A1 | 1/2005 | Lam |
| 2005/0066095 A1 | 3/2005 | Mullick et al. |
| 2006/0155946 A1 | 7/2006 | Ji |
| 2006/0242211 A1 | 10/2006 | Becker et al. |
| 2007/0055833 A1 | 3/2007 | Vu et al. |
| 2007/0174669 A1 | 7/2007 | Ebata et al. |
| 2008/0281877 A1 | 11/2008 | Wayda et al. |
| 2010/0042791 A1 | 2/2010 | Helman et al. |
| 2011/0246733 A1 | 10/2011 | Usgaonkar et al. |
| 2011/0271067 A1 | 11/2011 | Chou et al. |
| 2012/0254547 A1 | 10/2012 | Benhase et al. |
| 2012/0311261 A1 | 12/2012 | Mizuno et al. |
| 2013/0031058 A1 | 1/2013 | Adkins et al. |
| 2013/0080695 A1 | 3/2013 | Beeken |
| 2013/0138916 A1 | 5/2013 | Ohara et al. |
| 2013/0325824 A1 | 12/2013 | Shoens |
| 2014/0089264 A1 | 3/2014 | Nisha Talagala et al. |

* cited by examiner

| C0 | C5(3) | C9(2) | C8(3) | C11(2) |
|---|---|---|---|---|
| S1 | S14 | S12 | S10 | |
| S2 | | | S13 | |
| S3 | | | | |
| S7 | | | | |
| C0 | C5(3) | C9(2) | C8(3) | C11(2) |

S2 → DBA1

| SnapID | C0 | S3 | S2 | S1 | C5 | C9 | C8 | S13 |
|---|---|---|---|---|---|---|---|---|
| DBA | DBA6 | DBA2 | DBA1 | Free | DBA5 | DBA11 | DBA10 | Pass |

Figure 7a

C8 → DBA10

| SnapID | C0 | S3 | S2 | S1 | C5 | C9 | C8 | S13 |
|---|---|---|---|---|---|---|---|---|
| DBA | DBA6 | DBA2 | DBA1 | Free | DBA5 | DBA11 | DBA10 | Pass |

Figure 7b

S7 → DBA6

| SnapID | C0 | S3 | S2 | S1 | C5 | C9 | C8 | S13 |
|---|---|---|---|---|---|---|---|---|
| DBA | DBA6 | DBA2 | DBA1 | Free | DBA5 | DBA11 | DBA10 | Pass |

Figure 7c

C11 → DBA1

| SnapID | C0 | S3 | S2 | S1 | C5 | C9 | C8 | S13 |
|---|---|---|---|---|---|---|---|---|
| DBA | DBA6 | DBA2 | DBA1 | Free | DBA5 | DBA11 | DBA10 | Pass |

Figure 7d

S13 → DBA2

| SnapID | C0 | S3 | S2 | S1 | C5 | C9 | C8 | S13 |
|---|---|---|---|---|---|---|---|---|
| DBA | DBA6 | DBA2 | DBA1 | Free | DBA5 | DBA11 | DBA10 | Pass |

| C0 | C4(3) | C5(1) | C8(7) | C10(9) | C12(9) |
|----|-------|-------|-------|--------|--------|
| S1 | S9 | S6 | S11 |  | S14 |
| S2 |  | S7 |  |  | S15 |
| S3 |  |  |  |  |  |
| S13 |  |  |  |  |  |
| C0 | C4(3) | C5(1) | C8(7) | C10(9) | C12(9) |

802

S14 → DBA5

| SnapID | C0 | S13 | S1 | C4 | S9 | C5 | C8 | S11 | C12 | S14 |
|--------|-----|------|-----|------|------|------|------|------|------|------|
| DBA | DBA6 | DBA5 | DBA1 | DBA7 | Pass | DBA2 | DBA3 | Pass | DBA4 | Pass |

Figure 8b

S-tree (901-1)

Timeline of Events (902-1)

911

Clone Line Table (903-1)

| C0 |
| S1 |
| S2 |
| C0 |

MVE (905-1)

| SnapID |
| DBA |

DBA Assignment per Snap_ID (904-1)

| SnapID | C0 | S1 | S2 |
|---|---|---|---|
| DBA | Not allocated | Not allocated | Not allocated |

S-tree (901-3)

Timeline of Events (902-3)

Clone Line Table (903-3)

| C0 |
|----|
| S1 |
| S2 |
| C0 |

MVE (905-3)

| SnapID | C0 | S2 | S1 |
|--------|------|------|------|
| DBA | DBA2 | DBA1 | Pass |

DBA Assignment per Snap_ID (904-3)

| SnapID | C0 | S1 | S2 |
|--------|------|-----------------|------|
| DBA | DBA2 | Not allocated | DBA1 |

STORAGE SYSTEM AND METHODS OF MAPPING ADDRESSES OF SNAPSHOT FAMILIES

CROSS-REFERENCES TO RELATED APPLICATIONS

This application claims priority from U.S. provisional patent application No. 61/730,988 filed Nov. 29, 2012 and incorporated herein by reference in its entirety.

FIELD OF THE INVENTION

The present invention relates generally to systems and methods of storing data and, particularly, to methods of operating storage systems in the presence of a plurality of snapshots, and systems thereof.

BACKGROUND OF THE INVENTION

Modern storage systems are configured to enable providing copies of existing data for purposes of backup, possible restore in case of future data corruption, testing, etc. The copies may be provided with the help of backup and/or snapshot techniques. The use of snapshot techniques greatly reduces the amount of storage space required for archiving large amounts of data.

Problems of operating storage systems in the presence of a plurality of snapshots have been recognized in the conventional art and various techniques have been developed to provide solutions. For example:

US Patent Application No. 2011/0119459 (Satoyama et al.) discloses a storage system including a storage device which configures an original volume for storing data which is read/written by a host, a copy volume for storing a copy of the original volume at a predetermined timing, and a snapshot volume for storing a snapshot data which is a snapshot of the original volume; and a controller which controls access from the host to the storage device. The controller copies data of the original volume to the copy volume at a predetermined timing; stores the snapshot data in the snapshot volume corresponding to a write request to the original volume without decreasing a performance of the original volume; manages a generation of the stored snapshot according to predetermined copy volume blocks and snapshot volume blocks, and manages a generation of the copy volume; and reads data from the snapshot volume and/or the copy volume when a read request to a volume of a generation different from that of the original volume is received from the host, without decreasing a performance of the original volume.

US Patent Application No. 2008/172542 (Kaushik) discloses a method, apparatus and system of a hierarchy of a structure of a volume. In one embodiment, a system includes a physical volume, a structure to provide a mapping to a location of a data segment of the physical volume that may include a table having a hierarchy, a logical volume management module to define a logical volume as an arrangement of the physical volume, a snapshot module that may automatically generate a point-in-time image of the logical volume, may prompt the logical volume management module to create and insert a first table and a second table into the hierarchy of the structure, the first table may provide a set of updates to the logical volume, the second table may provide a set of updates to the point-in-time image, and a data processing system to perform a write IO operation and a read IO operation.

US Patent Application 2008/301203 (Adkins et al.) discloses an embodiment where at least one snapshot thread manages a point in time snapshot of a file system stored within the space allocated to the file system. The snapshot thread tracks, for at least one block of the plurality of blocks of the file system, a separate entry in a snapshot map specifying if each at least one block is newly allocated following the creation of the point in time snapshot and specifying an addressed location of a snapshot copy of the at least one block, if copied. Separately, a file system handling thread tracks a mapping of an allocation state of each of said plurality of blocks of the file system. Responsive to detecting the file system triggered to write or delete a particular block from among the at least one block of the file system, the snapshot thread allows the file system to write to or delete the particular block without making a snapshot copy of the particular block if a particular entry for the particular block in the snapshot map specifies the particular block is newly allocated, wherein a block marked newly allocated was not in-use at the point in time of the file system snapshot.

U.S. Pat. No. 6,038,639 (O'Brien et al.) discloses a data file storage management system for snapshot copy operations which maintains a two level mapping table enabling the data files to be copied using the snapshot copy process and only having to update a single corresponding mapping table entry when the physical location of the data file is changed. The snapshot copy updates to the contents of the first level of the two level mapping table, which are stored on the backend data storage devices to provide a record of the snapshot copy operation which can be used to recover the correct contents of the mapping table. This record of the snapshot copy operations remains valid even though the physical location of a copied data file instance is subsequently changed. Furthermore, the physical storage space holding the updated portions of the first level of the two level mapping table can be managed using techniques like those used to manage the physical storage space holding data file instances. Mapping table updates resulting from the snapshot copy operation are delayed until all mapping table updates resulting from earlier data file write operations have been completed and any attempt to update the mapping table to reflect data written to the original data file or the copy data file that occurs after initiation of the copy must wait until the first set of mapping table pointers have been copied.

U.S. Pat. No. 7,165,156 (Cameron, et al.) discloses a chain of snapshots including read-write snapshots descending from a read only snapshot. The read only snapshots present a constant view of the data at the time the read only snapshot is created, and the read-write snapshot starts with the view but can be modified by the user without changing the view of its parent snapshot (e.g., the read only snapshot). The read-write snapshot can be written for various testing purposes while the read only snapshot remains undisturbed to preserve the original data.

General Description

In accordance with certain aspects of the presently disclosed subject matter, there is provided a method of operating a storage system. The storage system is operable to manage a plurality of snapshot families, each snapshot family (SF) is constituted by SF members comprising a master logical volume and a plurality of snapshots corresponding thereto and is characterized by a SF logical address space associated with the SF. The method comprises generating in the storage system, for each given SF among the plurality of snapshot families, a corresponding first SF mapping data structure comprising one or more entries, wherein each entry is associated with a variable range of contiguous logical addresses within the SF logical address space and is characterized by a value indicative of length of the range and its offset in the SF logical address space, and wherein each entry in the first SF mapping data structure is further associated with a second SF data structure configured to provide mapping between the range of contiguous logical addresses associated with the entry into one or more physical address ranges, respectively correlated to the SF members. The method further comprises, upon receiving an access request specifying an addressed LUN and LBA range, the storage system identifying an addressed snapshot family and an addressed member therein corresponding to the addressed LUN; the storage system searching a first SF mapping data structure associated with the identified addresses SF for entry associated with a range of contiguous logical addresses corresponding to LBA range specified in the access request; and the storage system searching a respective second SF mapping data structure associated with the entry found in the first SF mapping data structure for identifying physical addresses corresponding to the requested LBA range in the addressed member of the addressed snapshot family.

In accordance with further aspects of the presently disclosed subject matter, the second SF mapping data structure can be configured to present any given range of physical addresses by one and only one representative member among the SF members sharing the given range of physical addresses. In case the addressed member of the addressed snapshot family is omitted in the respective second SF mapping data structure, the method can further comprise determining a respective representative member sharing physical addresses with the addressed member, and using physical address range correlated to the detected representative member as corresponding to the requested LBA range. The respective representative member can be determined in accordance with a predefined rule related to hierarchical and sequential relations between members of the addressed snapshot family. Determining the respective representative member sharing physical addresses with the addressed member, searching the respective second SF mapping data structure and identifying physical addresses corresponding to the requested LBA range can be provided as a single atomic operation.

In accordance with further aspects of the presently disclosed subject matter, the method can further comprise associating data received in the access request for writing with a first value indicative of the most recent snapshot which existed in the storage system at the time of writing the received data to a cache memory, and writing, to the cache memory, the received data in association with the first value and with a second value indicative of the addressed SF member.

In accordance with other aspects of the presently disclosed subject matter, there is provided a storage system comprising a plurality of physical storage devices controlled by a plurality of storage control devices constituting a storage control layer operatively coupled to a plurality of hosts and to the plurality of physical storage devices constituting a physical storage space, said control layer configured to manage a plurality of snapshot families, each snapshot family (SF) is constituted by SF members comprising a master logical volume and a plurality of snapshots corresponding thereto and is characterized by a SF logical address space associated with the SF. The control layer comprises means for generating, for each given SF among the plurality of snapshot families, a corresponding first SF mapping data structure comprising one or more entries, wherein each entry is associated with a variable range of contiguous logical addresses within the SF logical address space and is characterized by a value indicative of length of the range and its offset in the SF logical address space, and wherein each entry in the first SF mapping data structure is further associated with a second SF data structure configured to provide mapping between the range of contiguous logical addresses associated with the entry into one or more physical address ranges, respectively correlated to the SF members. The control layer further comprises means for identifying an addressed snapshot family and an addressed member therein corresponding to the addressed LUN upon receiving an access request specifying an addressed LUN and LBA range; means for searching a first SF mapping data structure associated with the identified addresses SF for entry associated with a range of contiguous logical addresses corresponding to LBA range specified in the access request; and means for searching a respective second SF mapping data structure associated with the entry found in the first SF mapping data structure for identifying physical addresses corresponding to the requested LBA range in the addressed member of the addressed snapshot family.

The control layer can further comprise means for associating data received in the access request for writing with a first value indicative of the most recent snapshot which existed in the storage system at the time of writing the received data to a cache memory, and means for writing, to the cache memory, the received data in association with the first value and with a second value indicative of the addressed SF member.

In accordance with other aspects of the presently disclosed subject matter, there is provided a method comprising the following operations provided by a storage system capable to maintain a snapshot family comprising a plurality of members having hierarchical relations therebetween: generating a mapping data structure comprising a plurality of mapping entries providing mapping for respective logical address ranges within a logical address space assigned to the snapshot family; configuring a mapping entry of the plurality of mapping entries to comprise one or more mappings for mapping a logical address range associated with the mapping entry into one or more physical address ranges, respectively correlated to one or more representative members of the snapshot family; omitting from the mapping entry a certain mapping corresponding to an omitted member comprised in the snapshot family and different from any of the one or more representative members sharing a respective range of physical addresses; and responsive to an access request directed to the logical address range and the omitted member, determining a representative member from the one or more representative members, the determining being provided using a predefined rule related to the hierarchical and sequential relations between members of the snapshot family; and responding to the access request by using a physical address range correlated to the representative member.

The mapping data structure can be configured to present a given range of physical addresses by one and only one representative member among the members sharing the given range of physical addresses. A size of the logical address space assigned to the family can be equal to size of logical address space of each of the members of the snapshot family, wherein each given offset in the respective snapshot family logical address space corresponds to a respective offset in any of the snapshot family's members.

In accordance with further aspects of the presently disclosed subject matter, the above methods can further comprise omitting from the mapping entry a mapping corresponding to any newly added member.

In accordance with further aspects of the presently disclosed subject matter, operations related to modification of hierarchical relations between members of the snapshot family can be provided as a foreground process and operations related to respective modification of the mapping structure can be provided as a background process.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 3 illustrates an exemplarily clone line table corresponding to the exemplarily S-tree illustrated in FIG. 2;

FIGS. 7a-7e illustrate non-limiting examples of using MVE for servicing read requests addressed to the exemplarily snapshot family illustrated in FIGS. 2-3;

FIG. 8b illustrates non-limiting examples of using MVE for servicing read requests addressed to the exemplary snapshot family illustrated in FIG. 8a;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "configuring" or the like, refer to the action and/or processes of a computer that manipulate and/or transform data into other data, said data represented as physical, such as electronic, quantities and/or said data representing the physical objects. The term "computer" should be expansively construed to cover any kind of electronic device with data processing capabilities including, by way of non-limiting example, storage system and parts thereof disclosed in the present application.

The operations in accordance with the teachings herein may be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages may be used to implement the teachings of the presently disclosed subject matter as described herein.

It is to be understood that the term "non-transitory" is used herein to exclude transitory, propagating signals, but to include, otherwise, any volatile or non-volatile computer memory technology suitable to the presently disclosed subject matter.

Figure 1:
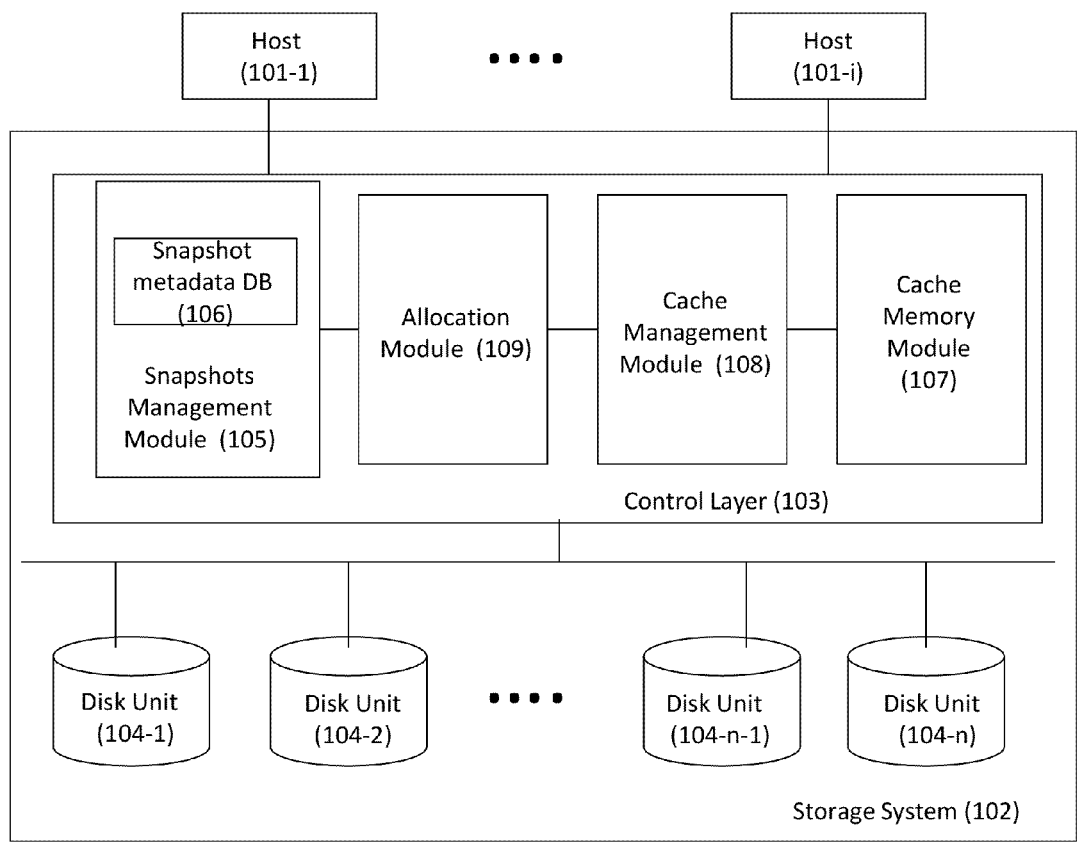
FIG. 1 illustrates a schematic functional diagram of a mass storage system in accordance with certain embodiments of the presently disclosed subject matter.

Bearing this in mind, attention is drawn to FIG. 1 illustrating a non-limiting example of a schematic functional diagram of a mass storage system in accordance with certain embodiments of the presently disclosed subject matter.

The illustrated mass storage system 102 provides common storage means to be shared by a plurality of host computers (illustrated as 101-1-101-n). The storage system comprises a control layer 103 comprising one or more appropriate storage control devices operatively coupled to the plurality of host computers and operable to control access operations between the plurality of host computers and a plurality of data storage devices (e.g. a plurality of physical disk drives (PD) organized in one or more arrays illustrated as disk units 104-1-104-n). The storage devices constitute a physical storage space optionally distributed over one or more storage nodes, wherein the storage control layer is operable to control interface operations (including access operations) between the host computers and the storage physical space. The storage system is configured in a manner enabling direct or indirect servicing a request directed at any available address in the physical storage space.

The physical storage space can comprise any appropriate permanent storage medium and can include, by way of non-limiting example, a plurality of physical disk drives (PD) organized in one or more arrays (illustrated as disk units 104-1-104-n). The physical storage space comprises a plurality of data blocks, each data block being characterized by a pair ($DD_{id}$, DBA), and where $DD_{id}$ is a serial number associated with the physical disk drive accommodating the data block, and DBA is a logical block number within the respective disk. By way of non-limiting example, $DD_{id}$ may represent a serial number internally assigned to the physical disk drive by the system or, alternatively, a WWN or universal serial number assigned to the disk drive by a vendor.

Stored data can be logically represented to a client in terms of logical objects. Depending on storage protocol, the logical objects may be logical volumes, data files, multimedia files, snapshots and other copies, etc. For purpose of illustration only, the following description is provided with respect to logical objects represented by logical volumes.

A logical volume (LV) is a virtual entity logically representing a plurality of data blocks and acting as basic units for data handling and organization within the system. Logical volumes are characterized by successive Logical Block Addresses (LBA) ranging from 0 to a number K, wherein K is the number of data blocks comprised in the logical volume.

Different LVs may comprise different numbers of data blocks, while the data blocks are typically of equal size (e.g. 512 bytes).

The same logical volume can be exposed to the outside world as one or more uniquely addressable logical units, each appearing as a single virtual storage device to hosts, file systems, databases, and other application programs. Each logical unit can be characterized by a logical unit identifier (e.g. a logical unit number, or LUN), used to identify the logical unit when addressed by the SCSI protocol or protocols which encapsulate SCSI, such as, for example, Fibre Channel or iSCSI. LUN numbers can be assigned to the logical units in accordance with an addressing scheme. By way of non-limiting example, in a multiple port storage array, a logical volume can be assigned a different LUN on each port through which the logical volume is accessed. Optionally, an external management server (not shown in FIG. 1) can keep a list of which LUNs each host and/or application is allowed to access.

When receiving a write request from a host, the storage control layer identifies a physical location(s) designated for writing the respective data. Similarly, when receiving a read request from the host, the storage control layer identifies the physical location(s) of the desired data portion(s) and further processes the request accordingly. The storage control layer further issues updates of a given data object to all storage nodes which physically store data related to the data object. The storage control layer is further operable to redirect, if required, the request/update to storage device(s) with appropriate storage location(s) irrespective of the specific storage control device receiving the access request.

The control layer further comprises a snapshot management module 105. The functions of the snapshot management module include managing the snapshots and groups thereof.

A snapshot logical volume (referred to hereinafter also as a "snapshot") is a logical entity representing a virtual copy of a source logical volume as it existed at the time of creating the snapshot. As will be further detailed with reference to FIGS. 2-3, a given snapshot (referred to hereinafter as a parent snapshot) can serve as a source volume for one or more further snapshots (referred to hereinafter as child snapshots). Each snapshot has one source logical volume (initial logical volume or a parent snapshot). A given logical volume at a starting point-in-time (referred to hereinafter as a master logical volume) and the snapshots corresponding thereto and created at different later points-in-time constitute a snapshot family associated with the given master logical volume. It is noted that starting point-in-time is configurable and any writable snapshot can be selected as a master volume of the snapshot family constituted by the master volume and its descendant snapshots. The master logical volume and the snapshots corresponding thereto are referred to hereinafter as snapshot family members. Some of the snapshots in the snapshot family can be writable, while other snapshots can be configured as read-only snapshots. The hierarchical relationship (e.g. siblings, parents, grandparents, siblings of a parent, descendants (children), etc.) between the members of the snapshot family can be represented as a tree with one or more branches.

For purpose of illustration only, in the following description a snapshot family corresponds to a given logical volume. Those skilled in the art will readily appreciate that the teachings of the present disclosure are applicable in a similar manner to a snapshot family corresponding to other appropriate logical groups (e.g. snapshots created at different point in time for a consistency group of logical volumes, for one or more virtual partitions, or for other logical objects).

A snapshot is usually implemented by using pointers. Any newly created snapshot shares data with the source logical volume with the help of pointers constituting a part of the system metadata. Hence, at the time of creation, the new snapshot consumes physical resources merely for storing related metadata, and no additional physical resources are required for storing data associated with the snapshot logical volume. Only when a portion of either the source or its respective snapshot is modified, new data is created and, accordingly, new physical resources are allocated to this data in the disks.

Each of the snapshot family's members comprises the same number of logical blocks. In order for either the source volume or the snapshot to be addressable from an external host via a SCSI command, a LUN has to be defined, thus enabling connection between a port in the host and the volume or snapshot via a respective port in the storage system. The information about the defined LUNs is stored as a part of the system metadata. Write or read requests are addressed to the LUN with specified ranges of LBAs. The storage system can interpret the request so that it will be addressed to the intended source volume or snapshot.

Metadata related to snapshot management can be managed by the snapshot management module 105 and accommodated at a dedicated location(s) in the storage devices and/or in a non-volatile memory comprised in the control layer (e.g. implemented as snapshot metadata database 106 of the snapshot management module). A copy of the snapshot metadata can further reside in the volatile memory. By way of non-limiting example, the metadata accommodated in connection with snapshots management can include the snapshot volume identifiers (e.g. Snap_ID, Snap_LUN, etc.), flags indicating various states related to the snapshot (e.g., in use, delete in progress, marked for deletion, delete complete, etc.), size of snapshot volumes, and other snapshot related metadata.

The storage control layer 103 further comprises a volatile cache memory 107 for temporarily storing the data to be written to the storage devices in response to a write command and/or for temporarily storing the data to be read from the storage devices in response to a read command. In accordance with certain embodiments of the present invention, the control layer further comprises a cache management module 108 operatively connected to the cache memory and to the snapshot management module 105.

During the write operation the data is temporarily retained in cache memory 107 until subsequently written to one or more data storage devices. Such temporarily retained data is referred to hereinafter as "write-pending" data or "dirty data". Once the write-pending data is sent to the respective nonvolatile storage medium, its status is changed from "write-pending" to "non-write-pending", and the storage system relates to this data as stored at the nonvolatile storage medium and allowed to be erased from the cache memory. Such data is referred to hereinafter as "clean data".

Optionally, the control layer can further comprise (not shown) a first virtual layer operable to represent the logical address space, the first virtual layer characterized by a plurality of virtual unit addresses (VUA). Alternatively or additionally, the control layer can further comprise a second virtual layer operable to represent the physical storage space, the second virtual layer characterized by a plurality of virtual disk addresses (VDA). By way of non-limiting example, respective architecture and operation of the control layer is detailed in International Patent Application No. WO 2010/092576 assigned to the Assignee of the present application and incorporated thereto by reference in its entirety.

Mapping between logical addresses (LBA addresses, VUA addresses) and physical addresses (VDA addresses, DBA addresses) can comprise at least one of the mapping options:
    a) mapping between LBA addresses and DBA addresses;
    b) mapping between VUA addresses and VDA addresses;
    c) mapping between LBA addresses and VDA addresses; and
    d) mapping between VUA addresses and DBA addresses.

For purpose of illustration only, in the following description the mapping is presented between LBA addresses and DBA addresses. Those skilled in the art will readily appreciate that the teachings of the present disclosure are applicable in a similar manner to other mapping options between logical addresses and physical addresses.

The control layer further comprises an allocation module 109 operatively coupled to the snapshot management module 105 and the cache management module 108. The allocation module 109 can be configured to handle one or more mapping data structures, each assigned to a respective given snapshot family and operable to provide mapping between one or more contiguous ranges of logical addresses within logical address space of the given snapshot family and physical addresses corresponding to a snapshot family member specified in an access request. Such data structure is referred to hereinafter as a snapshot family mapping data structure and is further detailed with reference to FIGS. 4-11.

The snapshot management module, the cache memory, the cache management module and the allocation module are operatively connected and configured to facilitate operations in accordance with the presently disclosed subject matter as further detailed with reference to FIGS. 2-11. The snapshot management module, the allocation module, the cache memory and/or the cache management module can be implemented as centralized modules operatively connected to the plurality of storage control devices or can be, at least partly, distributed over some or all storage control devices.

Those versed in the art will readily appreciate that the teachings of the presently disclosed subject matter are not bound by the system illustrated in FIG. 1, equivalent and/or modified functionality can be consolidated or divided in another manner and can be implemented in any appropriate combination of software, firmware and hardware.

Figure 2:
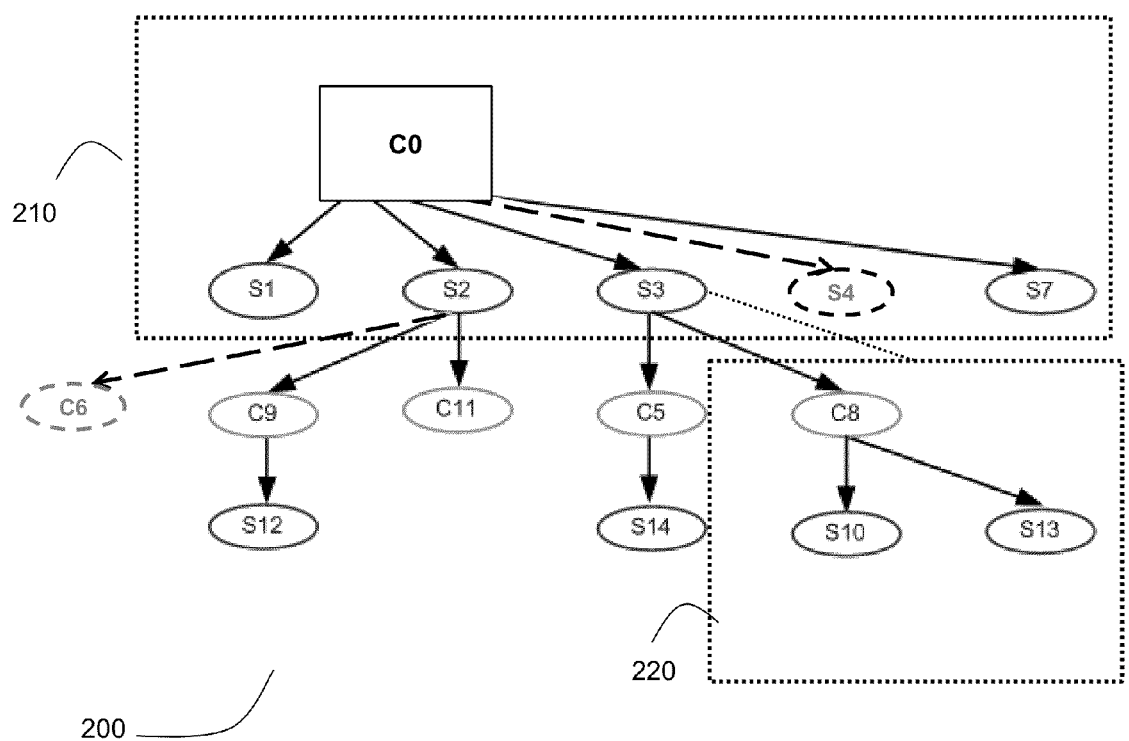
FIG. 2 illustrates an exemplarily snapshot family represented by a snapshot tree.

FIG. 2 illustrates an exemplarily snapshot family represented by a snapshot tree (referred to hereinafter also as S-tree). The illustrated S-tree 200 represents the relationship between a master logical volume C0 and its snapshots. Unless specifically stated otherwise, it is appreciated that throughout the specification the following terms should be construed as following:

Fam_ID denotes an identifier associated with the entire snapshot family including a master volume constituting a root of a respective snapshot family and its descendant snapshots. Members of the snapshot family are denoted by letter S indicative of read-only snapshots or by letter C indicative of the master volume or writable snapshots (also referred to hereinafter as clones). The members of the snapshot family are further denoted by a snapshot identifier, Snap_ID, which uniquely identifies a specific snapshot member within the snapshot family and is further indicative of the order of creation of the member. The snapshot identifier may be for example the version of the snapshot, a value representing a timestamp of creation, a running index, etc. A snapshot identifier of an earlier created member is smaller than a snapshot identifier of a later created snapshot. Referring to S-Tree 200, snapshot S10, for example, was created before S12, S13, S14 and C11 (even though the latter resides in a higher hierarchy level in the tree than the hierarchy level of S10). The master volume is denoted as C0.

It is noted that if writable snapshots are not supported, the S-tree only includes C0 as the root with all the snapshots residing at the same level next to C0.

By way of non-limiting example, the illustrated snapshot family is generated in a manner that read-only snapshots are generated as children of writeable snapshots (clones), and the clones are generated as children of read-only snapshots, i.e. a parent of a read-only member is always a writable member of the snapshot family.

In the illustrated S-tree, the writable master volume C0 has direct read-only children S1, S2, S3, S4 and S7. Snapshots C5, C8, S14, S10 and S13 are descendants of S3 while S10 and S13 are children of C8; C6, C9, C11 and S12 are descendants of S2 while S12 is a child of C9. Dashed lines for S4 and C6 denote that these snapshots have been deleted.

S-tree 200 is updated (e.g. by the snapshot management module) each time a snapshot in the family is created, removed or restored.

In accordance with certain embodiments of the presently disclosed subject matter, each node of the S-Tree can be associated with information relating to a respective member of the snapshot family: e.g. references to an older sibling in the S-tree, references to a younger sibling, parent, descendants, read-only flag, etc. Fast access to the nodes in the S-Tree can be enabled by maintaining a Snapshot Lookup Table. Optionally, a separate look-up table can be assigned to each snapshot family. The Snapshot Lookup Table is characterized by Snap_ID as a key, and a pointer to the location of the respective node in memory as the lookup value.

A group of snapshots, constituted by a writable member and one or more generations of read-only children with no writable member between the generations, is referred to hereinafter as an inheritance cluster. For example, in the illustrated S-tree 200, an inheritance cluster 210 includes the master volume C0 and read-only snapshots S1, S2, S3, S4 and S7. An inheritance cluster can be further associated with a direct parent of its writable member, this direct parent can serve as a link to an upper level inheritance cluster. For example, an inheritance cluster 220 includes the writable member C8, its read-only descendants S10 and S13. The inheritance cluster 220 is further associated with S3, the read-only parent of the writable member C8, which links between cluster 220 and the upper inheritance cluster 210.

Each writable member of the snapshot family can be associated with a corresponding inheritance cluster. A sequential relationship between the members of a given inheritance cluster can be represented by a column in a clone line table, such a column being referred to hereinafter as a clone line. The clone line table comprises one or more clone lines, one clone line for each writable family member. A clone line of a given writable family member (such member being referred to hereinafter also as a parent clone) comprises a sequence of the parent clone and read-only members of a respective inheritance cluster, the sequence order being in accordance with respective creation time. The clone line further comprises a value indicative of the direct parent of the parent clone, this direct parent associated with the respective inheritance cluster and linking the cluster to the upper levels in the S-tree.

An exemplarily clone line table 300 corresponding to the S-tree 200 is illustrated in FIG. 3. The numbers in brackets in the first elements of the clone lines are indicative of direct parents of respective parent clones.

For example, the clone line 301 corresponds to the inheritance cluster 210. The clone line comprises the master volume C0 as a parent clone and the read-only snapshots S1, S2, S3 and S7 being the direct children of the master volume. The snapshot S1 has been created before the snapshot S2; the snapshot S3 has been created after the snapshot S2 but before the snapshot S7. The clone line 302 with the parent clone C5 further comprises the read-only snapshot S14. The value in brackets indicates that the clone C5 is the direct child of S3. The clone line 303 with the parent clone C9 comprises the read-only snapshot S12. The value in brackets indicates that the clone C9 is the direct child of S2. The clone line 304 with the parent clone C8 corresponds to the inheritance cluster 220 and further comprises the read-only snapshots S10 and S13 being the direct children of the clone C8. The value in brackets indicates that the clone C8 is the direct child of S3. The clone line 305 with the parent clone C11 does not comprise any direct child. The value in brackets indicates that the clone C11 is the direct child of S2.

Optionally, in addition to the sequence of a parent clone and its read-only children, a clone line can be configured to comprise the parent clone also as a last element, thereby enabling traversing the table in a hierarchical manner. It is appreciated that throughout the following specification a parent clone is considered as a first and a last element in a respective clone line.

The clone-line table is updated (e.g. by the snapshot management module) each time a snapshot in the family is created, removed or restored.

Figures 4A, 4B:
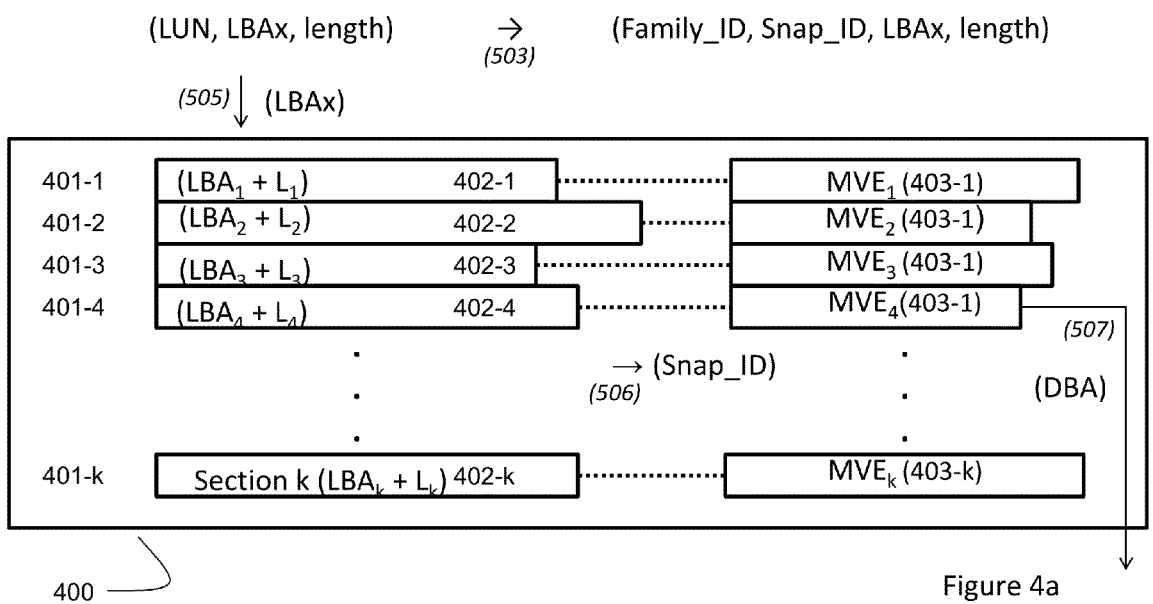
FIG. 4a illustrates a snapshot family mapping data structure configured in accordance with certain embodiments of the presently disclosed subject matter.
FIG. 4b illustrates an exemplarily MVE data structure corresponding to a given LBA range in the snapshot family illustrated in FIGS. 2 and 3.

FIG. 4a illustrates a snapshot family mapping data structure (referred to hereinafter also as SFM data structure or SFM) configured in accordance with certain embodiments of the presently disclosed subject matter.

Each snapshot family is provided (e.g. by the allocation module 109 in cooperation with the snapshot management module 105) with a snapshot family mapping data structure assigned thereto. Family_ID of a snapshot family is also indicative of the assigned SFM data structure.

For each access request addressed to a member of given snapshot family, the SFM data structure is operable to provide mapping between the request (LUN, LBAx, length) specifying an addressed LUN, an offset $LBA_x$ and a length of the required LBA range and physical addresses corresponding to the request. Thus, the entire snapshot family is mapped to physical addresses corresponding to different family members with the help of the SFM data structure associated with that family.

In accordance with certain embodiments of the presently disclosed subject matter, each family is characterized by a snapshot family logical address space (also referred to hereinafter as SF logical address space). The size of SF logical address space is equal to the size of any of the family members' logical volumes, while a given offset in the SF logical address space corresponds to the same offset in any one of the family member volumes. By way of non-limiting example, an offset LBAx in the SF logical address space corresponds to offset LBAx in an access request (LUN1, LBAx, length1) addressed to a snapshot family member and to LBAx in an access request (LUN2, LBAx, length2) addressed to another member of the same snapshot family.

The SFM data structure 400 includes one or more entries (illustrated as 401-1-401-k), each entry corresponding to a certain variable-length range of contiguous logical addresses within the SF logical address space. A range of logical addresses is contiguous in a SF logical address space, if this range is contiguous in any one of the members of respective snapshot family. Each mapping entry maps a different range of logical addresses and different entries may map a different size of range.

Each entry is characterized by a value indicative of offset in SF logical address space and length of a contiguous LBA range corresponding to the entry (illustrated, respectively, as 402-1-402-k) within the snapshot family logical address space. For example, a certain entry can correspond to logical address range 0-64 Kbyte (i.e. address range of 64K length with zero offset in the SF logical address space), while the next entry can correspond to the logical address range 64 Kbyte-1024 Kbyte (i.e. address range of 960K length with offset=64K in the SF logical address space). It is noted that lengths of contiguous LBA ranges corresponding to the entries are defined in multiples of fixed-length (e.g. 64 Kb) LBA data range. For purpose of illustration only, the access operations are further described herein in terms of entire data portions being multiples of the data blocks corresponding to this fixed-length LBA data range. Those skilled in the art will readily appreciate that the teachings of the present invention are applicable in a similar manner to partial data portions.

Each entry is further configured to comprise one or more mappings for mapping an LBA range associated with the mapping entry into one or more physical address ranges respectively correlated to one or more members of the snapshot family. Each of the mappings correlates a physical address range to a member of the family, for example, by including in the mapping entry a tuple of physical address range and the correlated member. Other correlation techniques may be used, for example: the mapping entry can include a list of physical address ranges and a bitmap that indicates which family member has a corresponding physical address range, for example, a set bit indicates that the corresponding member is correlated with a physical address range that is included in the entry, wherein the first set bit correlates the corresponding member to the first physical address range in the list of physical address ranges.

By way of non-limiting example, the mappings for a given entry can be provided by a data structure (illustrated, respectively, as 403-1-403-k) associated with the entry and configured to provide mapping between LBA range corresponding to the entry and range of physical addresses assigned to different members of the snapshot family. Such data structure is referred to hereinafter as a multiple value entry (MVE) data structure or MVE.

As will be detailed further with reference to FIGS. 4b-11, a given MVE data structure 403-k provides, for contiguous LBA range 402-k in a SF logical address space, association between members in the snapshot family and values indicative of DBA ranges assigned to these members.

The length of the contiguous LBA range can vary from entry to entry in the SFM data structure. The length of contiguous LBA range in a given entry and/or it's offset in SF logical address space can also vary depending on different (e.g. write, delete, etc.) operations provided with regard to the logical address space of the snapshot family. Responsive to transferring a certain LBA range from one SFM entry to another, respective Snap_ID"*DBA mapping data can be transferred to MVE data structure associated with another SFM entry.

Figure 5:
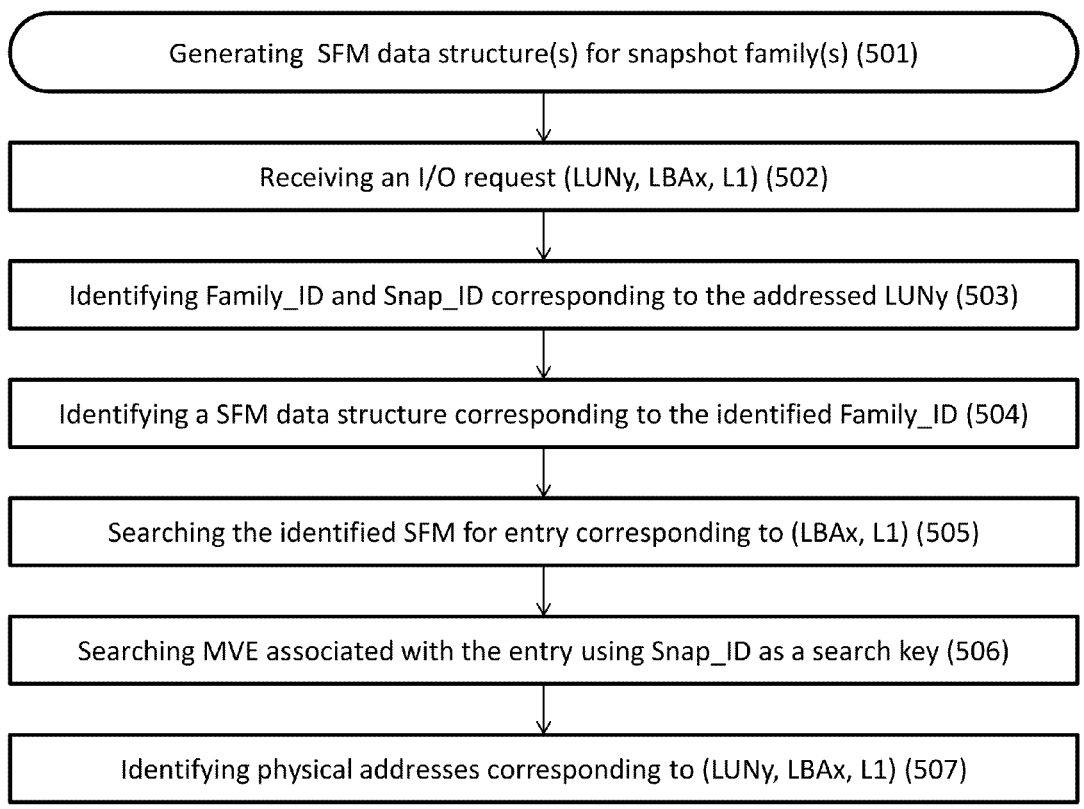
FIG. 5 illustrates a generalized flow chart of servicing an access request addressed to a given LUN in accordance with certain embodiments of the presently disclosed subject matter.

Referring to FIG. 5, there is illustrated a generalized flow chart of servicing an access request addressed to a given LUN in accordance with certain embodiments of the presently disclosed subject matter.

Each snapshot family is provided (e.g. by the allocation module 109 in cooperation with the snapshot management module 105) with a corresponding SFM data structure. Upon receiving an access request (LUNy, LBAx, L1) (502) addressed to a snapshot family member corresponding to LUNy, the control layer (e.g. using the snapshot management module 105) identifies (503) Family_ID and Snap_ID corresponding to the addressed LUNy. It is noted, that access request can be addressed only to snapshots with assigned LUNs.

The control layer further identifies (e.g. using the allocation module 109) a snapshot family mapping data structure corresponding to the identified Family_ID (504) and uses the LBA range specified in the request for searching (505) the identified SFM for entry corresponding to this LBA range (i.e. entry corresponding to the range LBAx, L1 within the SF logical address space).

For purpose of illustration only, in the following description access requests are addressed to LBA ranges corresponding to a single SFM entry. Those skilled in the art will readily appreciate that the teachings of the present disclosure are applicable in a similar manner to any addressed LBA range (e.g. an access request addressing LBA ranges in several SFM entries can be handled as several access requests, each addressing LBA range in a single entry).

The control layer further uses Snap_ID as a key for searching (506) MVE associated with the found entry for identifying (507) the physical addresses corresponding in the addressed member of the snapshot family to the requested LBA range. By way of non-limiting example, searches 505, 506 and 507 can be provided by the allocation module 109.

Referring back to FIG. 4a, by way of non-limiting example, a snapshot family mapping data structure can be configured as a mapping tree. The mapping tree can be configured as an ordered tree data structure comprising one or more leaves. For example, the tree can be configured in a manner detailed in US Patent Application No. 2011/0082997 assigned to the Assignee of the present application and incorporated herewith by reference in its entirety. A depth of a leaf in the tree can represent a length of contiguous range of logical addresses represented by the leaf, a path followed from a tree root to the leaf can indicate an offset of the range of addresses within the snapshot family logical address space; and MVE associated with the leaf can indicate corresponding DBA ranges assigned to different members of the snapshot family. Accordingly, the control layer can traverse the tree in order to find a leaf corresponding to the requested LBA range and further use MVE associated with the leaf for identifying DBA range corresponding to the addressed Snap_ID.

Referring to FIG. 4b, there is illustrated an exemplary MVE corresponding to a given LBA range in the snapshot family illustrated with reference to FIGS. 2 and 3.

The illustrated MVE data structure 404 provides, for a given LBA range, association between two multi-value entries: snapshots entry 405 comprising values (e.g. respective Snap_ID) indicative of members in the snapshot family and physical storage entry 406 comprising values indicative of DBA ranges corresponding to the values in the snapshots entry 405.

A given physical address range can be shared by more than one family member. Each value in the physical storage entry 406 corresponds to a physical address range assigned to one or more snapshot family members sharing the same physical addresses corresponding to the given LBA range.

The MVE data structure can be configured to present a given DBA range by one or more family members (referred to hereinafter as representative members) sharing the given DBA range, whilst to omit from the snapshot entry at least one family member (referred to hereinafter as an omitted member) sharing the given DBA range and different from any of the representative members.

In accordance with certain embodiments of the presently disclosed subject matter, the MVE data structure can be configured to provide uniqueness of presenting a given DBA range, i.e. the given DBA range shared by several family members is presented in the MVE data structure only once in association with one and only one family member among the family members sharing the respective DBA range. The rest of the family members sharing the same DBA range can be identified in accordance with pre-defined rules by using the MVE and data informative of the hierarchical and sequential relationship of the members in the snapshot family (e.g. S-tree and/or clone lines data structures).

For example, if all members sharing the same range of physical addresses are members of the same inheritance cluster (e.g. comprised in the same clone line), the snapshot entry of MVE data structure can include only the earliest created among them If the members sharing the same range of physical addresses belong to a different inheritance cluster (e.g. comprises different clone lines), the snapshot entry of MVE data structure includes only the latest created member in the earliest created (i.e. upper layer) inheritance cluster.

In the illustrated non-limiting example, the master volume C0 has been modified after creation of the snapshots S1, S2 and S3 in the clone line 301, while there was no further modification of the master volume upon creating the snapshot S7. Accordingly, the snapshot S7 shares the range of physical addresses with the master volume C01, and snapshot entry 405 of the illustrated MVE data structure 404 does not comprise value indicative of S7, and a request addressed S7 or C0 will be mapped to the same DBA6 range.

In the illustrated non-limiting example, the parent clone C8 has been modified after the snapshot S13 has been created. The value in the physical storage entry corresponding to S13 (specified as "pass") is indicative that the respective snapshot does not share data with the modified parent and DBA range corresponding to the snapshot is presented by a snapshot from an upper level inheritance cluster.

In the illustrated example the physical address range corresponding to snapshot S1 has been unmapped (or, optionally, has been never written or allocated). The corresponding value in the physical storage entry is specified as "free".

Those versed in the art will readily appreciate that uniqueness of presenting a shared DBA range in MVE by one and only one family member among the family members sharing the same DBA range can be implemented in a manner other than illustrated with reference to FIG. 4b.

Figure 6:
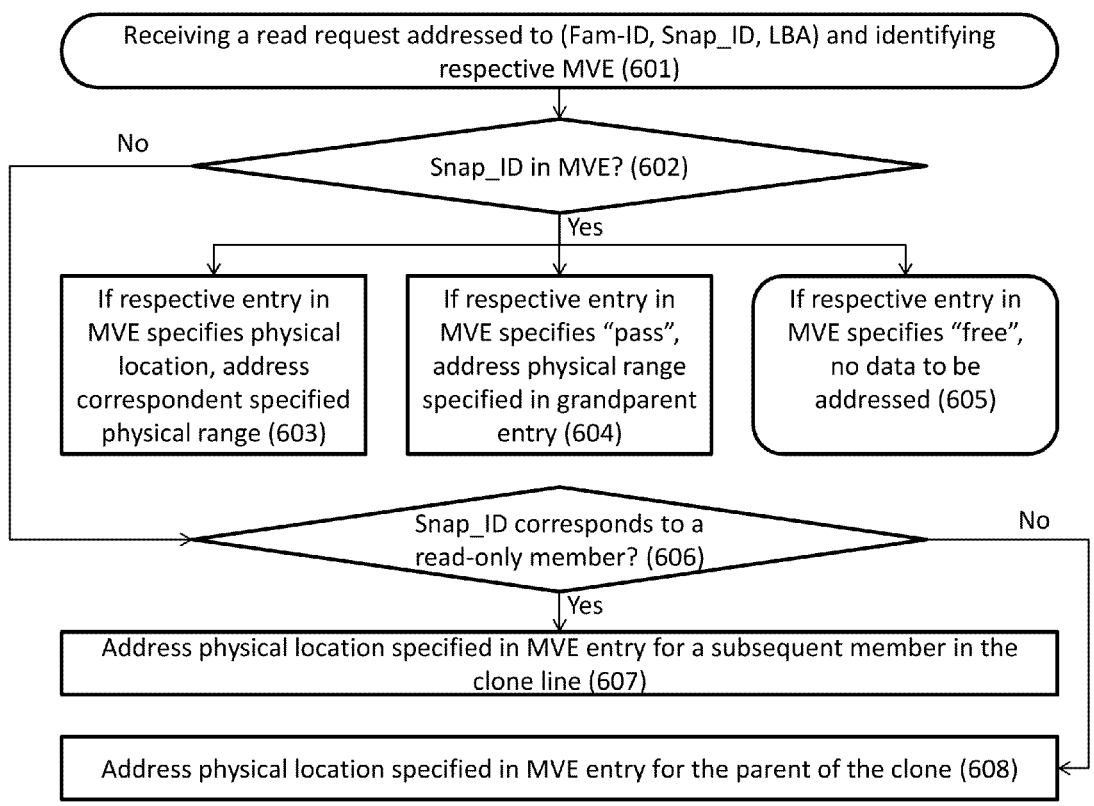
FIG. 6 illustrates a generalized flow chart of servicing a read request in accordance with certain embodiments of the presently disclosed subject matter.

FIG. 6 illustrates a generalized flow chart of servicing a read request addressed to an LBA range in a snapshot family member. In accordance with certain embodiments of the currently presented subject matter, the control layer (e.g. using the snapshot management module 105), upon receiving (601) a read request, translates the addressed LUN into respective (Fam_ID, Snap_ID), and identifies respective SFM data structure corresponding to Fam_ID and respective MVE data structure corresponding to the addressed LBA range. The control layer further checks (602) (e.g. using the allocation module 109) if the snapshot entry in the identified MVE data structure comprises a value indicative of requested Snap_ID. If the MVE data structure comprises the requested Snap_ID, and the physical storage entry specifies a corresponding DBA range, this specified DBA range shall be addressed (603) when servicing the read request. For example, with MVE as illustrated in FIG. 4b, if the read request is addressed to the snapshot S2, the respective DBA range to be used is DBA1 as illustrated in FIG. 7a. Likewise, if the read request is addressed to the snapshot C8, the respective DBA range to be used is DBA10 as illustrated in FIG. 7b.

If the access request is directed to a member omitted in the MVE data structure, the control layer (e.g. the allocation module 109 cooperation with the snapshot management module 105) determines in the MVE data structure a representative member sharing the physical address range with the addressed omitted member. The control layer further uses DBA range correlated to the representative member when serving the access request. The control layer determines the representative member using predefined rule(s) related to the hierarchical and sequential relations between the members of the snapshot family. Optionally, the rules can be accommodated in the snapshot management module.

The rule can specify an order of searching a representative member among the SF members. Such a rule corresponds to the rule of modifying the MVE data structure responsive to S-tree modifications and/or destaging events. By way of non-limiting example, the rule can specify that SF members, with closer hierarchical relationship, be checked first. The search can start from the oldest among all siblings that are newer than the omitted member, then the second oldest is checked, until all the newer siblings are checked. If no representative member is found among the siblings (i.e. no newer sibling is correlated to a physical address in the mapping entry or there are no newer siblings), the next SF member to be checked for presence in the mapping entry can be the parent, then the grandparent, and so on.

By way of non-limiting example, in cases where MVE data structure is characterized by uniqueness of presenting the shared DBA ranges, the control layer can determine the representative member using the following rules.

If the identified MVE data structure does not comprise the requested Snap_ID, the control layer checks (606) (e.g. using the snapshot management module 105) if the addressed snapshot is a read-only member of the snapshot family. If Yes, the control layer looks for a member of the same inheritance cluster as the requested snapshot and having Snap_ID specified in the MVE. For example, the control layer can traverse a respective clone line and look for subsequent member (i.e. later created snapshot or the parent clone), such member having Snap_ID and corresponding DBA range specified in the MVE. DBA range corresponding to specified in the MVE member of the same inheritance cluster is the DBA range to be addressed (607) when servicing such a read request. For example, as illustrated in FIG. 7c, if the read request is addressed to omitted in the MVE snapshot S7, the DBA range to be used shall correspond to the parent clone C0, i.e. the DBA range is DBA6. If no members of the same inheritance cluster have Snap_ID specified in the MVE, the control layer operates as further detailed with reference to operation (608). If no DBA range is specified for a member of the same inheritance cluster with Snap_ID specified in MVE, the control layer operates, respectively, as further detailed with reference to operations (604) or (605).

The control layer can use the clone line table for looking up the required family member of the same inheritance cluster. For example, for a given read-only snapshot having no Snap_ID in the MVE data structure, the control layer can identify the clone line corresponding to the required snapshot, and look down the column until finding a member succeeding the requested member and presented in the snapshot entry of the MVE data structure.

If the MVE data structure does not comprise the Snap_ID required in the read request, and the addressed snapshot is a writable member of the snapshot family, the control layer looks for a parent of the addressed snapshot (e.g. snapshot indicated in brackets near the addressed parent clone at the head of the respective clone line). DBA range corresponding to the parent of the writable snapshot shall be addressed (608) when servicing such a read request. For example, as illustrated in FIG. 7d, if the read request is addressed to the clone C11, the DBA range to be used shall correspond to the parent S2 of this parent clone C11, i.e. the requested DBA range is DBA1. If no DBA range is specified for the respective parent of the writable snapshot, the control layer operates, respectively, as further detailed with reference to operations (604) or (605).

If the MVE data structure comprises the requested Snap_ID, but the respective value in the physical storage entry is specified as "free", there is no data to be addressed (605) when servicing the respective request (optionally, in response to the request, the control layer can return zeroes).

If the MVE data structure comprises the requested Snap_ID, but the respective value in the physical storage entry comprises "pass" indication (i.e. the parent has been modified after the requested child has been created), the control layer looks for a parent (not necessarily a direct parent) of a writable snapshot (e.g. parent clone in the respective clone line) corresponding to the requested snapshot, such a parent being the first parent having Snap_ID and respectively specified DBA range in the MVE. DBA range corresponding to such parent shall be addressed (604) when servicing such a read request. For example, as illustrated in FIG. 7e, if the read request is addressed to the snapshot S13, the respective value in the physical storage entry specifies "pass".

The control layer passes over the parent C8 of the snapshot S13 and looks up for S3 being the parent of C8. The DBA range to be used shall correspond to S3, i.e. the required DBA range is DBA2.

The control layer will operate in a similar manner also if the respective Snap_ID has been requested resulting a preceding look-up for Snap_ID required in the read request (e.g. in operations 607 and/or 608). Those versed in the art will readily appreciate that, depending on the manner of modifying the MVE data structure responsive to S-tree modifications and/or destaging events, the representative members can be defined by other rules related to hierarchical and sequential relations between members of the snapshot family.

Figure 8A:
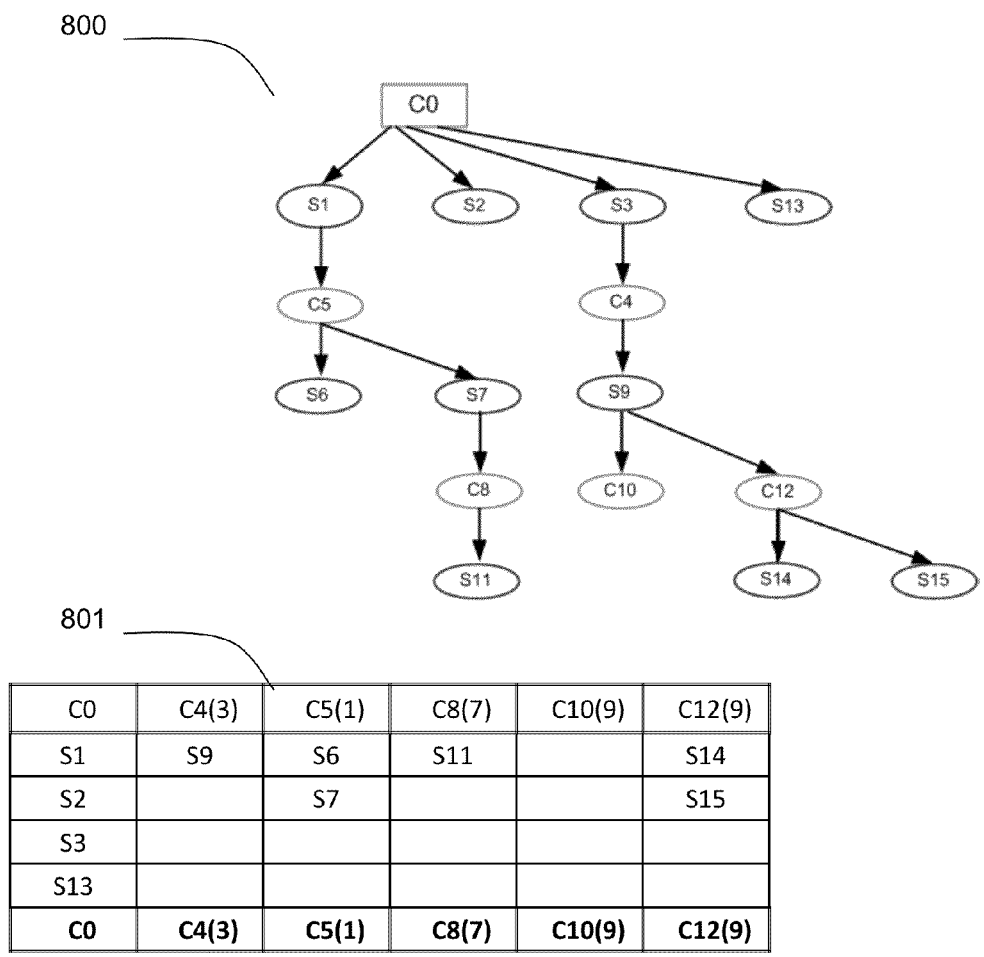
FIG. 8a illustrates an exemplary snapshot family.

Referring to FIG. 8b, there is illustrated another non-limiting example of using MVE 802 for mapping between the sections and DBA ranges for another snapshot family illustrated in FIG. 8a by S-tree 800 and by clone table 801.

As illustrated in FIG. 8b for read request addressed to the read-only snapshot S14, the MVE 803 comprises the respective Snap_ID. However, there is no respectively specified DBA range. In accordance with "pass" indication corresponding to Snap_ID=S14, the control layer passes over S14 and its direct parent C12 and looks (604) for S9 being the parent of C12. The MVE 803 comprises the respective Snap_ID, however, there is no respectively specified DBA range. In accordance with "pass" indication corresponding to Snap_ID=S9, the control layer passes over S9 and its direct parent C4 and looks (604) for S3 being the parent of C4. The Snap_ID=S3 is not specified in the MVE 803. Accordingly, the control layer looks for a subsequent member in the clone line (607). The later created snapshot S13 has Snap_ID and corresponding DBA range specified in the MVE 803. The DBA range to be used corresponds to S13, i.e. the required DBA range is DBA5.

In accordance with certain embodiments of the presently disclosed subject matter, the detailed above determining the representative member, searching therefor in the MVE data structure in response to a read request and identifying corresponding DBA range is provided as a single atomic operation, i.e. an operation that either succeeds or fails in its entirety and not in a partial way.

FIGS. 9a-9j illustrate non-limiting examples of evolution of an S-tree (from 901-1 to 901-10), a clone line table (from 903-1 to 903-10), a mapping table (from 904-1 to 904-10) indicative of DBA assignments for family members and of MVE data structure (from 905-1 to 905-10) in correspondence with events related to the snapshot family and illustrated in a timeline of events (from 902-1 to 902-10). It is noted that mapping table 904 represent all family members corresponding to specified DBA range and is used for illustration only, while the MVE data structure 905 enables uniqueness of presenting a given shared DBA range by one and only one family member and is a part of SFM data structure stored and maintained in the storage system. In a mass-storage system a snapshot family can comprise thousands, or even several thousands of snapshots. Using the MVE data structure (preferably MVE data structure with uniqueness of presenting a given shared DBA range) instead of mapping table representing all family members allows increasing effectiveness of snapshot management.

The illustrated events include creating of new snapshots and operations related to writing to the cache memory and to the physical address space (destaging).

Figure 9A:
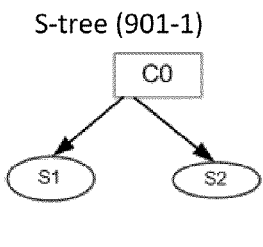
FIGS. 9a-9j illustrate non-limiting examples of evolution of an S-tree, a clone line table and of MVE data structure in correspondence with events related to the snapshot family illustrated in FIGS. 2-3.
Figure 9A:
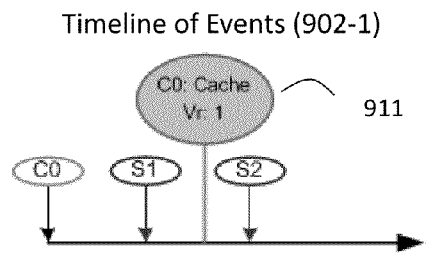

In accordance the timeline 902-1 illustrated in FIG. 9a, after creating the read-only snapshot S1 of the master volume C0, the control layer receives a write request addressed to the master volume. The write request specifies the addressed family member (C0 in the illustrated example). The control layer enables writing data (event 911) to the cache memory.

In accordance with certain embodiments of the presently disclosed subject matter, the control layer is configured (e.g. with the help of the snapshot management module) to recognize a current snapshot identifier indicative of the most recent snapshot and to associate data to be cached with the latest snapshot identifier existing at the time of writing a given data portion to a cache memory. Such snapshot identifier associated with the cached data is referred to hereinafter as Snap_version of the cached data. Thus, data cached in the cache memory is associated with an indication of the addressed snapshot family member and with Snap_version value.

In the non-limiting example illustrated in FIG. 9a, the data written to the cache memory is associated with the indication of Snap_version=1 (denoted as Vr.=1) as, at the moment of writing, the latest created snapshot (i.e. snapshot S1) had Snap_ID=1. Snapshot S2 is created after writing the data 911 to the cache memory. The illustrated in FIG. 9a stage does not comprise destaging data from the cache memory to the physical storage space. Accordingly, no DBA allocation has been provided, and the mapping table 904-1 and MVE data structure 905-1 are empty. The S-tree 901-1 and the clone line table 903-1 represent the snapshot family at the end of the illustrated stage.

Figure 9B:
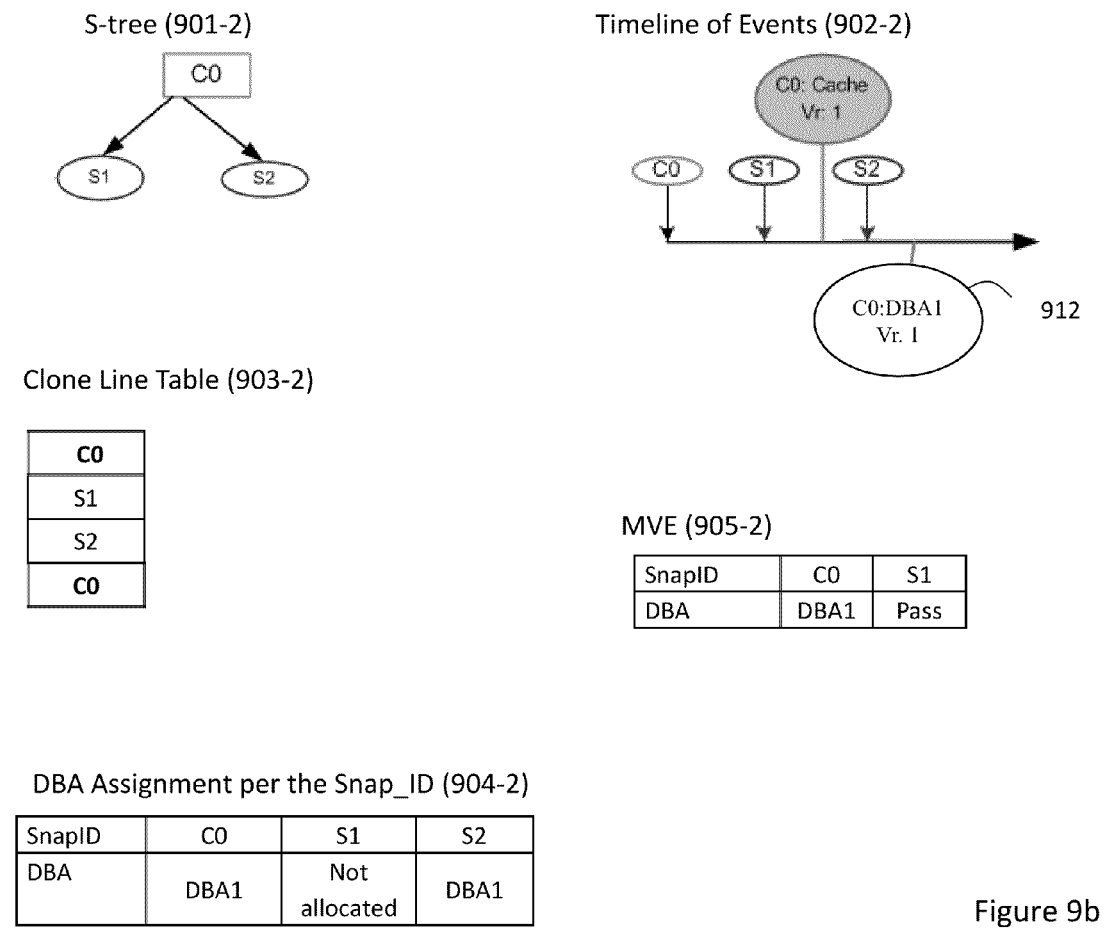

Referring to FIG. 9b, as illustrated in the timeline 902-2, data 911 cached in the cache memory has been destaged to the physical address range DBA1 (event 912: destage (C0: DBA1, vr.1)). No changes have been provided in S-tree 901-2 and in clone line table 903-2. As illustrated in the mapping table 904-2, since C0 has been modified after creation of S1 and before S2 creation, there is no DBA assigned to S1, while S2 shares the same DBA1 range as the master volume C0. Accordingly, snapshot entry of the MVE data structure 905-1 does not comprise Snap_ID=2. C0 represents DBA1 for both the master volume as well as the omitted member S2. Since no data has been written to S1, the value corresponding to Snap_ID=1 is specified in the physical storage entry as "pass".

Figure 9C:
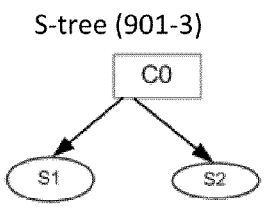
Figure 9C:
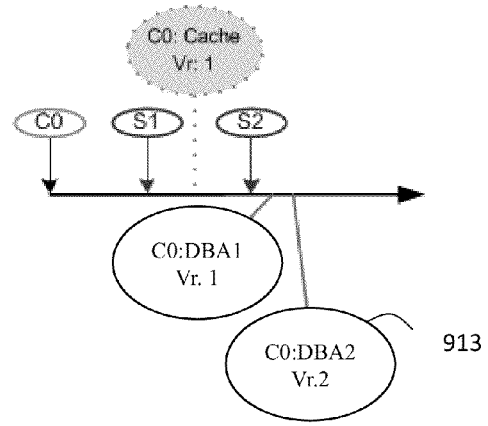

At the stage illustrated in FIG. 9c, after creating the snapshot S2, the control layer has received a new write request addressed to the master volume C0, and new data associated with Snap_version=2 has been written (not illustrated) to the cache memory and has been destaged to the physical address range DBA2 (event 913, destage (C0: DBA2, vr.2)). No changes have been provided in S-tree 901-3 and in clone line table 903-3. As illustrated in the mapping table 904-3, DBA assigned to C0 is changed to DBA2, while DBA assigned to S2 continues to be in DBA1. Since C0 and S2 no longer share the same DBA, C0 cannot represent the DBA for S2 and S2 has to be included in the MVE. Thus snapshot entry in MVE data structure 905-3 comprises value Snap_ID=2 with corresponding value DBA1 in the physical storage entry.

Figure 9D:
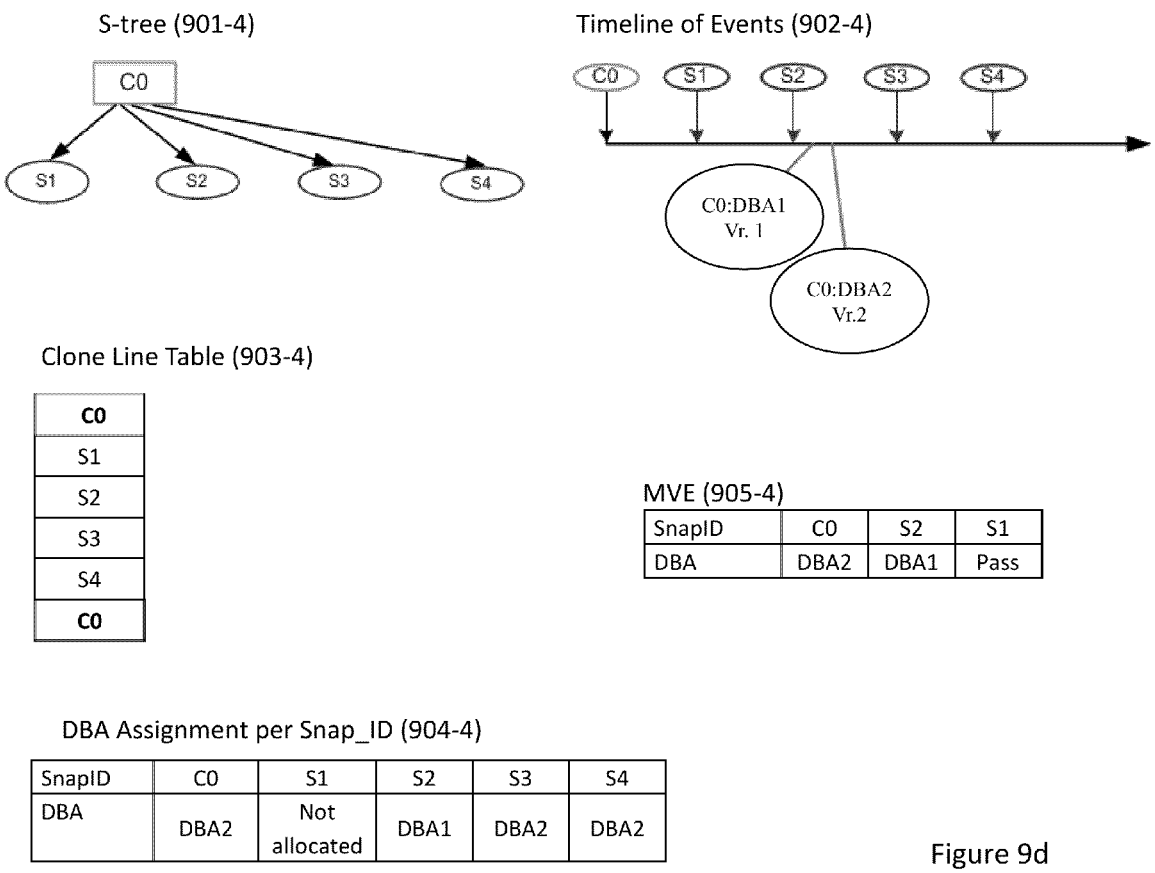

Referring to FIG. 9d, as illustrated in the timeline 902-4, new snapshots S3 and S4 have been created. S-tree 901-4 and clone line table 902-4 have been updated accordingly to present the newly created snapshots as direct children of the master volume C0. As illustrated in the mapping table 904-4, the new snapshots correspond to the same DBA2 range as the master volume C0. Accordingly, snapshot entry of the MVE data structure 905-2 does not comprise entries for Snap_ID=3 and Snap_ID=4, and respective snapshots can be looked up as was detailed with reference to FIG. 6. Thus, the MVE data structure is not modified, the newly created SF members are omitted in MVE and yet DBA2 range is represented in the MVE by the master volume C0.

Figure 9E:
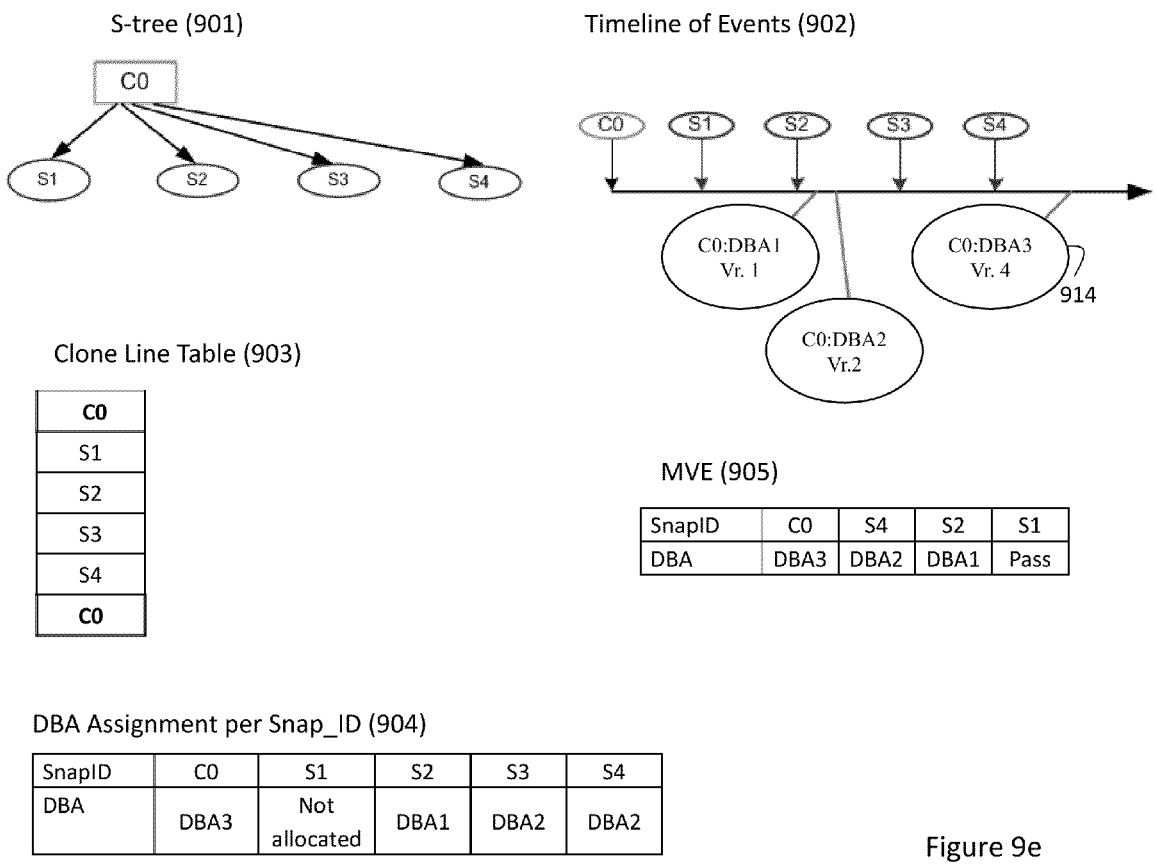

Referring to FIG. 9e, as illustrated in the timeline 902-5, after creating the snapshot S4, the control layer has received a new write request addressed to the master volume C0, new data associated with Snap_version=4 has been written (not illustrated) to the cache memory and has been destaged to the physical address range DBA3 (event 914, destage (C0: DBA3, vr.4)). No changes have been provided in S-tree 901-5 and in clone line table 903-5. As illustrated in the mapping table 904-5, DBA assigned to C0 is changed to DBA3, while S3 and S4 continue to share DBA2. Since C0 no longer shares DBA range with the snapshots S3 and S4, the snapshot entry in MVE data structure 905-5 comprises value Snap_ID=4 (among S3 and S4, the snapshot S4 is the latest in the clone line) with corresponding value DBA2 in the physical storage entry.

It is noted that snapshots with Snap_ID smaller or equal to Snap_version of a destage data are not affected by such destaging.

Figure 9F:
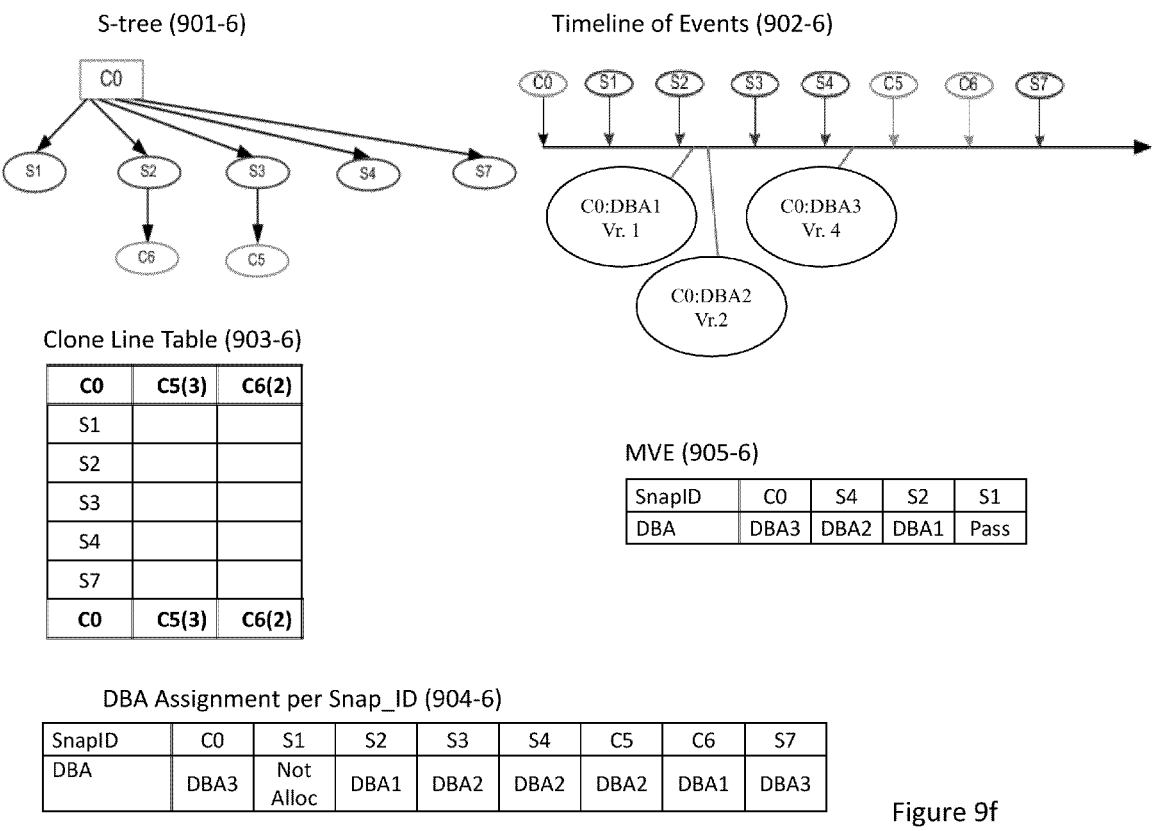

Referring to FIG. 9f, as illustrated in the timeline 902-6, new clones C5 and C6 and the read-only snapshot S7 have been created. The S-tree 901-6 and the clone line table 903-7 have been updated accordingly to present the newly created clone C5 as direct child of S3, clone C6 as direct child of S2 and the snapshot S7 as direct child of the master volume C0. C5 shares DBA2 range with its parent S3 and with S4. The value DBA2 in the physical storage entry of the MVE should have uniqueness representation, i.e. to correspond to one and only one Snap_ID among the members sharing the same DBA range. As presented by way of non-limiting example in MVE data structure 905-6, this only one member is selected among the sharing members as the last member in the earliest clone line, i.e. S4. As was detailed with reference to FIG. 6, when the control layer looks up and does not find C5 in the MVE, it looks for its parent S3. When S3 is also not found, the control layer searches down the clone line comprising S3 (i.e. the clone line with C0 as a parent clone) and finds S4 sharing the same DBA2 range with C5 and presented in the MVE.

The new clone C6 shares DBA1 with its parent S2, which is already represented in the MVE 905-6, thus need not be added to the MVE. Likewise, the new snapshot S7 shares DBA3 with its parent C0, which is already represented in the MVE 905-6, thus need not be added to the MVE data structure.

Figure 9G:
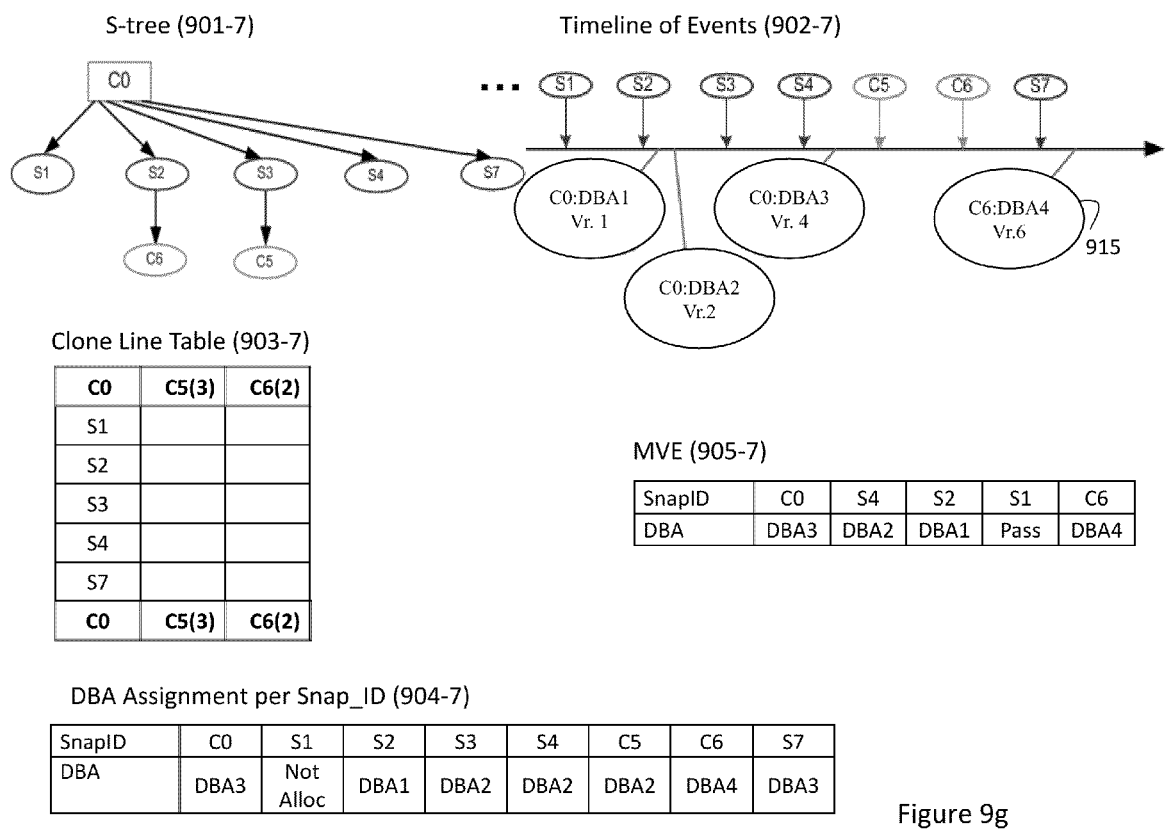

Referring to FIG. 9g, as illustrated in the timeline 902-7, after creating the clone C6 and before creating the snapshot S7, the control layer has received a new write request addressed to the clone C6, new data has been written (not illustrated) to the cache memory (bearing indication of Snap_version=6) and has been destaged to the physical address range DBA4 (event 915, destage (C6: DBA4, vr.6)) after creating the snapshot S7. No changes have been provided in S-tree 901-7 and in clone line table 903-7. As illustrated in the mapping table 904-7, DBA assigned to C6 is changed to DBA4. Accordingly, upon destaging, the snapshot entry in MVE data structure 905-7 is updated to include value Snap_ID=6 with corresponding value DBA4 in the physical storage entry.

Figure 9H:
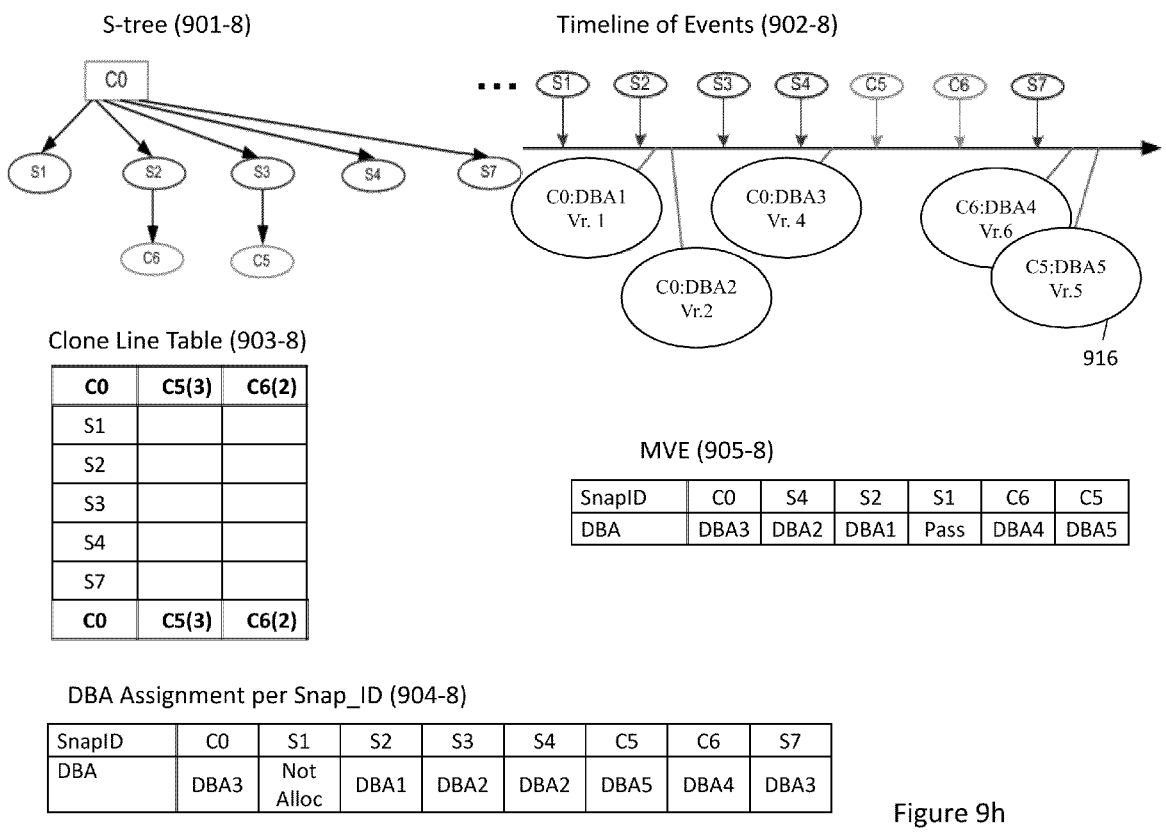

Likewise, as illustrated in FIG. 9h, after creating the clone C5 and before creating the clone C6, the control layer has received a new write request addressed to the clone C5, new data has been written (not illustrated) to the cache memory (bearing indication of Snap_version=5) and has been destaged to the physical address range DBA5 (event 916, destage (C5: DBA5, vr.5)) after creating the snapshot S7. No changes have been provided in S-tree 901-8 and in clone line table 903-8. As illustrated in the mapping table 904-8, DBA assigned to C5 is changed to DBA5. Accordingly, upon destaging, the snapshot entry in MVE data structure 905-8 is updated to include value Snap_ID=5 with corresponding value DBA5 in the physical storage entry.

Figure 9I:
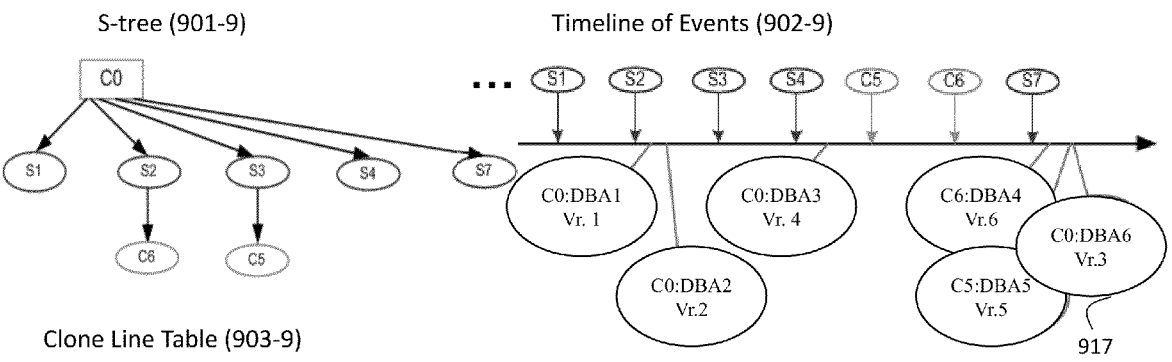

Referring to FIG. 9i, as illustrated in the timeline 902-9, upon creating the snapshot S3 and before creating the snapshot S4, the control layer has received a new write request addressed to the master volume C0, new data has been written (not illustrated) to the cache memory (bearing indication of Snap_version=3) and has been destaged to the physical address range DBA6 (event 917, destage (C0: DBA6, vr. 3)) after creating the snapshot S7. No changes have been provided in S-tree 901-9 and in clone line table 903-9.

As several snapshots have been created between writing data to the cache and destaging therefrom, the control layer needs to update the MVE 905-9 accordingly. The received write request can affect the members created after S3 and not modified before the destaging event 917, i.e. the snapshots S4 and S7. Accordingly, as illustrated in the mapping table 904-9, upon destaging, S4 and S7 share DBA6 with the master volume C0. Before the destage event 917, the snapshot S4 shared DBA2 with S3, and DBA2 was presented in the MVE 905-8 by Snap_ID=4. Since, upon the destage event 917, the snapshots S4 and S7 share DBA6 with the master volume (the latest element in the respective clone line), the snapshot entry in MVE data structure 905-9 is updated to exclude S4 and to include S3 as corresponding to the range DBA2.

As illustrated, the DBA range corresponding to S4 has been changed with no changes of S4. If an access request addressed to the snapshot S4 arrives before the destage event 917, the request will be served using DBA2 address range.

Figure 9J:
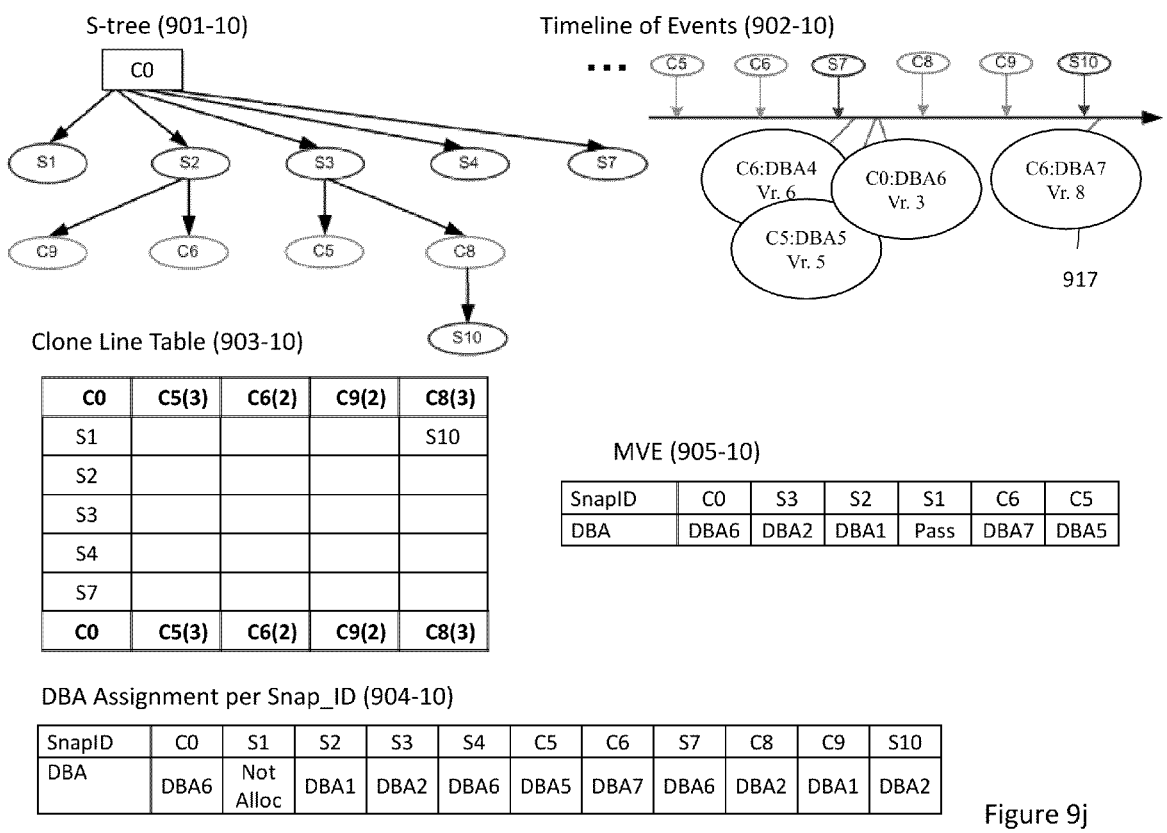

Referring to FIG. 9j, as illustrated in the timeline 902-10, new clones C8 and C9 and the read-only snapshot S10 have been created. The S-tree 901-10 and the clone line table 903-10 have been updated accordingly to present the newly created clone C8 as direct child of S3, clone C9 as direct child of S2 and the snapshot S10 as direct child of the clone C8. As presented in the mapping table, C8 shares DBA2 range with its parent S3 and with its child S10; C9 shares DBA1 range with S2. Upon creating the clone C8 and before creating the clone C9, the control layer has received a new write request addressed to the clone C6, new data has been written (not illustrated) to the cache memory (bearing indication of Snap_version=8) and has been destaged to the physical address range DBA7 (event 918, destage (C6: DBA7, vr. 8)) after creating the snapshot S10. Accordingly, the physical storage entry of the MVE 905-10 is updated so that the value Snap_ID=5 in the snapshot entry corresponds to the value DBA7. Since there is no member corresponding to the range DBA4, this range can be discarded and deleted from the MVE.

Among advantages of certain embodiments of the presently disclosed subject matter is independent, whilst coordinated, management of activities within a cache and activities related to the cache. SF mapping data structure and elements thereof are updated responsive to different destaging event as, for example, destaging data received in a write request, destaging data in conjunction with snapshots removal, restoring or un-mapping, etc.

Figure 10:
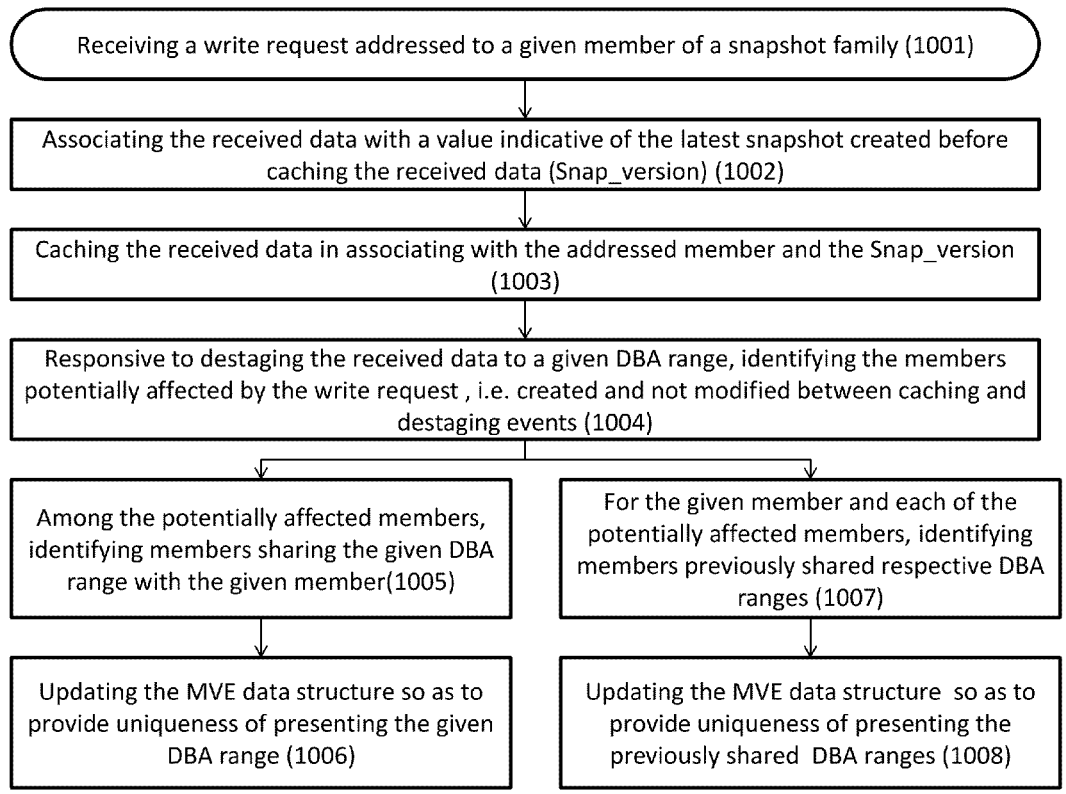
FIG. 10 illustrates a generalized flow chart of updating MVE data structure in correspondence with write operations addressed to snapshot family members in accordance with certain embodiments of the presently disclosed subject matter.

FIG. 10 illustrates a generalized flow chart of updating an MVE data structure in correspondence with write operations addressed to one or more family members.

As illustrated in the non-limiting examples illustrated in FIGS. 9a-9j, responsive to write request (1001) addressed to a logical address range and a given member of a snapshot family, the control layer associates (1002) data received in the request with a Snap_version (i.e. value indicative of identifier of the latest snapshot which existed at the time of writing a given data portion to a cache memory); and enables writing (1003) to the cache memory the received data in association with the addressed member and the Snap_version.

MVE data structure is updated responsive to destaging the received data to a given DBA range. The control layer (e.g. the snapshot management module) identifies (1004) the members of the snapshot family potentially affected by the write request.

Such potentially affected members can be snapshots created between the caching and the destaging events. The control layer further identifies (1005), among the potentially affected members, the members sharing the given DBA range with the given addressed member, and modifies (1006) the MVE data structure so as to provide uniqueness of presenting the given shared DBA range by one and only one family member among the family members sharing the DBA range. The uniqueness of presenting the given DBA range is obtained by selecting a representative member and omitting other members sharing the given DBA range. By way of non-limiting example, the oldest SF member among SF members sharing the given DBA range can be kept as the representative member in the MVE data structure, while the other SF members sharing the same given DBA range can be omitted. By way of another non-limiting example, the newest SF member among SF members sharing the given DBA range can be selected as the representative member in the MVE data structure, while the other SF members sharing the same given DBA range can be omitted in the MVE.

The control layer further identifies (1007), for the given addressed member and each of the potentially affected members, the SF members sharing respective DBA ranges and modifies (1008) the MVE data structure so as to provide uniqueness of presenting each of the shared DBA ranges (except when the obsolete DBA ranges, if any, do not correspond to any of the members upon the destage, such DBA ranges will be discarded).

It is to be understood that MVE is ignorant of data stored in the cache memory as long as the respective data is not destaged, and MVE is updated (e.g. by the allocation module) responsive to the respective destage events.

In accordance with certain embodiments of the presently disclosed subject matter, the control layer provides destaging data from the cache memory as a single atomic operation including: requesting a new DBA (e.g. from the allocation module); writing the destaged data to the new DB; and updating the MY as detailed with reference to FIG. 11.

Figure 11:
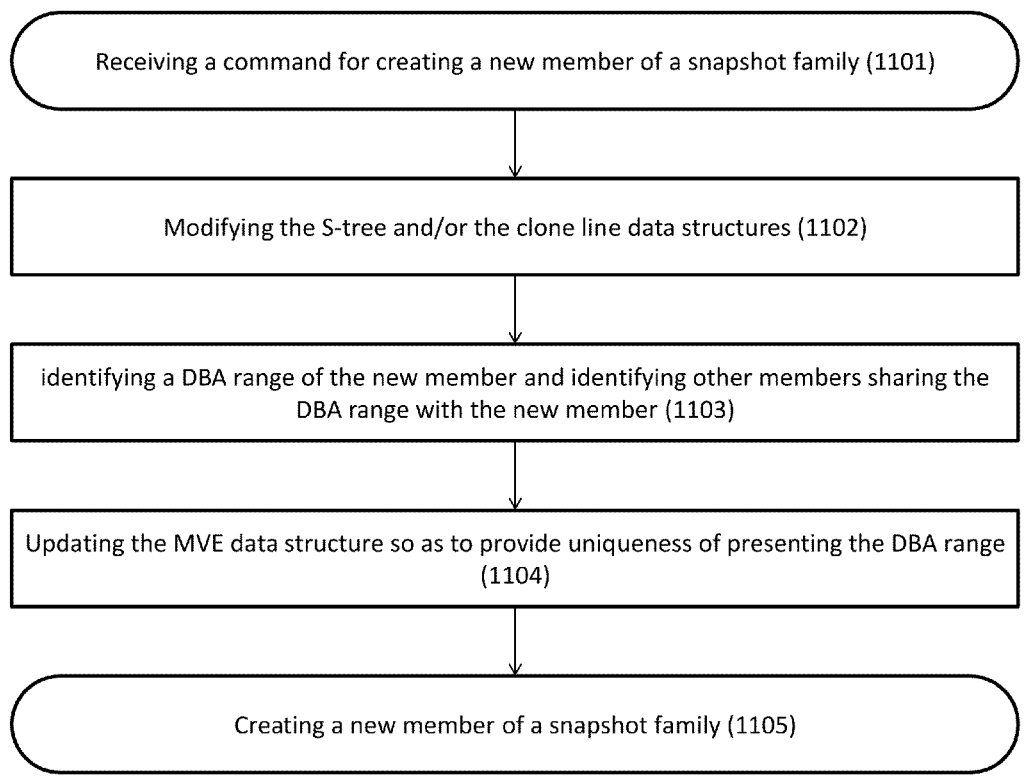
FIG. 11 illustrates a generalized flow chart of creating a new member of snapshot family in accordance with certain embodiments of the presently disclosed subject matter.

Referring to FIG. 11, there is illustrated a generalized flow chart of creating a new member of the snapshot family. Upon receiving (1101) a command for creating a new member of a snapshot family, the control layer respectively modifies (1102) data structure(s) indicative of a hierarchical relationship between the members in the snapshot family (e.g. the snapshot tree and/or clone line table) to include the new member.

It is noted that, at the moment of creation, a new SF member always shares DBA range with a previously created member. In a case when the MVE data structure is configured to omit a newly added SF member, the control layer creates (1105) the new SF member with no need in MVE modification. Among advantages of such MVE configuration is increased effectiveness of snapshot management because of capability of serving access requests directed to the newly added SF members with no need for MVE modification.

If the MVE data structure is configured to use a newly added SF member as a representative member, the control layer further identifies (1103) a DBA range corresponding to the new member in accordance with his place in the family hierarchy, and identifies other family members sharing this DBA range with the new member. The control layer further updates (1104) the MVE data structure to provide uniqueness of presenting the respective DBA range by the new member and completes the process of creating (1105) the new member of the snapshot family.

Non-limiting examples of handling the MVE data structure in accordance with S-tree modifications by creating new members are illustrated with reference to FIGS. 9a-9j.

Optionally, the process of creating the new member can be divided into foreground and background operations. As a foreground atomic operation, responsive to a "create snapshot" command, the snapshot management module can modify the S-tree and provide the respective acknowledgement. Operations 1103 and 1104 (when necessary) can be provided as a background process, thus enhancing performance of the storage system. Likewise, when removing a snapshot, responsive to a "remove snapshot" command, the snapshot management module can provide a foreground atomic operation including modifying the S-tree and providing the respective acknowledgement. Operations of respective updating the MVE data structure can be provided as a background process. Thus, operations related to modification of hierarchical relations between members of the snapshot family can be provided as a foreground process and operations related to respective modification of the mapping structure(s) can be provided as a background process.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the system according to the invention may be, at least partly, a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of operating a storage system operable to manage a plurality of snapshot families, each snapshot family (SF) is constituted by SF members comprising a master logical volume and a plurality of snapshots corresponding thereto and is characterized by a SF logical address space associated with the SF, the method comprising:
   generating in the storage system, for each given SF among the plurality of snapshot families, a corresponding first SF mapping data structure comprising one or more entries,
   wherein each entry is associated with a variable range of contiguous logical addresses within the SF logical address space and is characterized by a value that is indicative of a length of the range and its offset in the SF logical address space, and
   wherein each entry in the first SF mapping data structure is further associated with a second SF data structure configured to provide mapping between the range of contiguous logical addresses associated with the entry into one or more physical address ranges, respectively correlated to the SF members;
   upon receiving an access request specifying an addressed LUN (Logical Unit Number) and LBA (Logical Block Address) range, identifying, by the storage system, an addressed snapshot family and an addressed member therein corresponding to the addressed LUN;
   searching, by the storage system, a first SF mapping data structure associated with the identified addresses SF for entry associated with a range of contiguous logical addresses corresponding to LBA range specified in the access request; and
   searching, by the storage system, a respective second SF mapping data structure associated with the entry found in the first SF mapping data structure for identifying physical addresses corresponding to the requested LBA range in the addressed member of the addressed snapshot family.

2. The method of claim 1, wherein the second SF mapping data structure is configured to present any given range of physical addresses by one and only one representative member among the SF members sharing the given range of physical addresses.

3. The method of claim 2, in case the addressed member of the addressed snapshot family is omitted in the respective second SF mapping data structure, further comprising determining a respective representative member sharing physical addresses with the addressed member, and using physical address range correlated to the detected representative member as corresponding to the requested LBA range.

4. The method of claim 3 wherein the respective representative member is determined in accordance with a predefined rule related to hierarchical and sequential relations between members of the addressed snapshot family.

5. The method of claim 3 wherein determining the respective representative member sharing physical addresses with the addressed member, searching the respective second SF mapping data structure and identifying physical addresses corresponding to the requested LBA range are provided as a single atomic operation.

6. The method of claim 1 further comprising updating the respective second SF mapping data structure responsive to destaging data received in the access request for writing.

7. The method of claim 6, wherein the second SF mapping data structure is configured to present, before and after updating, any given range of physical addresses by one and only one representative member among the SF members sharing the given range of physical addresses.

8. The method of claim 1 further comprising associating data received in the access request for writing with a first value indicative of the most recent snapshot which existed in the storage system at the time of writing the received data to a cache memory, and writing, to the cache memory, the received data in association with the first value and with a second value indicative of the addressed SF member.

9. A storage system comprising a plurality of physical storage devices controlled by a plurality of storage control devices constituting a storage control layer operatively coupled to a plurality of hosts and to the plurality of physical storage devices constituting a physical storage space, said control layer configured to manage a plurality of snapshot families, each snapshot family (SF) is constituted by SF members comprising a master logical volume and a plurality of snapshots corresponding thereto and is characterized by a SF logical address space associated with the SF, wherein the control layer comprises:
 means for generating, for each given SF among the plurality of snapshot families, a corresponding first SF mapping data structure comprising one or more entries,
 wherein each entry is associated with a variable range of contiguous logical addresses within the SF logical address space and is characterized by a value that is indicative of a length of the range and its offset in the SF logical address space, and
 wherein each entry in the first SF mapping data structure is further associated with a second SF data structure configured to provide mapping between the range of contiguous logical addresses associated with the entry into one or more physical address ranges, respectively correlated to the SF members;
 means for identifying an addressed snapshot family and an addressed member therein upon receiving an access request specifying an addressed LUN (Logical Unit Number) and LBA (Logical Block Address) range;
 means for searching a first SF mapping data structure associated with the identified addresses SF for entry associated with a range of contiguous logical addresses corresponding to LBA range specified in the access request; and
 means for searching a respective second SF mapping data structure associated with the entry found in the first SF mapping data structure for identifying physical addresses corresponding to the requested LBA range in the addressed member of the addressed snapshot family.

10. The storage system of claim 9, wherein the second SF mapping data structure is configured to present a given range of physical addresses by one and only one representative member among the SF members sharing the given range of physical addresses.

11. The storage system of claim 9, wherein the control layer further comprises means for updating the respective second SF mapping data structure responsive to destaging data received in the access request for writing.

12. The storage system of claim 9, wherein the control layer further comprises means for associating data received in the access request for writing with a first value indicative of the most recent snapshot which existed in the storage system at the time of writing the received data to a cache memory, and means for writing, to the cache memory, the received data in association with the first value and with a second value indicative of the addressed SF member.

13. A method comprising:
 by a storage system capable to maintain a snapshot family comprising a plurality of members having hierarchical relations therebetween:
 generating a mapping data structure comprising a plurality of mapping entries providing mapping for respective logical address ranges within a logical address space assigned to the snapshot family;
 configuring a mapping entry of the plurality of mapping entries to comprise one or more mappings for mapping a logical address range associated with the mapping entry into one or more physical address ranges, respectively correlated to one or more representative members of the snapshot family;
 omitting from the mapping entry a certain mapping corresponding to an omitted member comprised in the snapshot family and different from any of the one or more representative members sharing a respective range of physical addresses; and
 responsive to an access request directed to the logical address range and the omitted member, determining a representative member from the one or more representative members, the determining being provided using a predefined rule related to the hierarchical and sequential relations between members of the snapshot family; and
 responding to the access request by using a physical address range correlated to the representative member.

14. The method of claim 13, wherein the mapping data structure is configured to present a given range of physical addresses by one and only one representative member among the members sharing the given range of physical addresses.

15. The method of claim 13, wherein a size of the logical address space assigned to the family is equal to size of logical address space of each of the members of the snapshot family, and wherein each given offset in the respective snapshot family logical address space corresponds to a respective offset in any of the snapshot family's members.

16. The method of claim 13 further comprising updating the mapping data structure responsive to destaging data received in the access request for writing.

17. The method of claim 16, wherein the mapping data structure is configured to present, before and after updating, any given range of physical addresses by one and only one representative member among the members sharing the given range of physical addresses.

18. The method of claim 13 further comprising associating data received in the access request for writing with a first value indicative of the most recent snapshot which existed in the storage system at the time of writing the received data to a cache memory, and writing, to the cache memory, the received data in association with the first value and with a second value indicative of a member directed in the access request.

19. The method of claim 13 further comprising omitting from the mapping entry a mapping corresponding to any newly added member.

20. The method of claim 13, wherein operations related to modification of hierarchical relations between members of the snapshot family are provided as a foreground process and operations related to respective modification of the mapping structure are provided as a background process.

\* \* \* \* \*